United States Patent [19]
Fischer

[11] Patent Number: 5,752,894
[45] Date of Patent: May 19, 1998

[54] APPARATUS FOR UTILIZING AND OPERATING A HYDROKINETIC TORQUE CONVERTER WITH LOCKUP CLUTCH

[75] Inventor: Robert Fischer, Bühl, Germany

[73] Assignee: Luk Getriebe-Systeme GmbH, Buhl, Germany

[21] Appl. No.: 306,671

[22] Filed: Sep. 15, 1994

[30] Foreign Application Priority Data

Sep. 17, 1993 [DE] Germany .................. 43 31 708.1
Dec. 23, 1993 [DE] Germany .................. 43 44 111.4

[51] Int. Cl.$^6$ ............... B60K 17/06; F16H 45/02; F16F 15/12
[52] U.S. Cl. ............ 477/169; 192/106.2; 477/176
[58] Field of Search ............... 192/106.2, 3.29, 192/207, 212, 3.3, 3.63, 103 F, 109 F; 464/64, 66, 68; 477/169, 176, 80

[56] References Cited

U.S. PATENT DOCUMENTS

| | | | |
|---|---|---|---|
| 4,422,535 | 12/1983 | Ling | 192/106.2 X |
| 4,509,627 | 4/1985 | Kawamoto | 192/103 F X |
| 4,572,339 | 2/1986 | Koshimo | 192/106.2 X |
| 4,645,053 | 2/1987 | Kitayama | 192/106.2 |
| 4,857,032 | 8/1989 | Aiki et al. | 192/106.2 X |
| 4,966,261 | 10/1990 | Kohno et al. | 192/106.2 X |
| 5,020,647 | 6/1991 | Fujimoto et al. | 192/106.2 X |
| 5,035,308 | 7/1991 | Baba et al. | 192/3.3 X |
| 5,045,027 | 9/1991 | Larsen | 192/207 X |
| 5,052,978 | 10/1991 | Hanke | 192/106.2 X |
| 5,065,642 | 11/1991 | Kagiyama et al. | 192/106.2 X |
| 5,257,687 | 11/1993 | Cooke | 192/106.2 |
| 5,289,737 | 3/1994 | Kuhne | 192/106.2 X |
| 5,374,218 | 12/1994 | Reik et al. | 192/106.2 X |
| 5,484,353 | 1/1996 | Lux et al. | 477/169 |

FOREIGN PATENT DOCUMENTS

| | | | |
|---|---|---|---|
| 59-151625 | 8/1984 | Japan | 192/106.2 |
| 2256262 | 12/1992 | United Kingdom | 192/106.2 |

*Primary Examiner*—Khoi Q. Ta
*Attorney, Agent, or Firm*—Darby & Darby

[57] ABSTRACT

The power train of a motor vehicle employs a torque transmitting apparatus having a hydrokinetic torque converter with a lockup clutch and a torsional damper between the output member of the clutch and the hub of the turbine in the cover of the torque converter. The torque capacity of the damper is less than the nominal torque of the engine whose output element drives the cover of the torque converter. The lockup clutch is designed in such a way that the transmission of torque from the cover to the damper can be regulated in several stages, one of which involves the transmission of torque within a range of between about 10% and 60% of the maximum torque transmitted by the engine and another of which involves the transmission of torque corresponding to not less than 60% of the maximum torque transmitted by the engine.

10 Claims, 6 Drawing Sheets

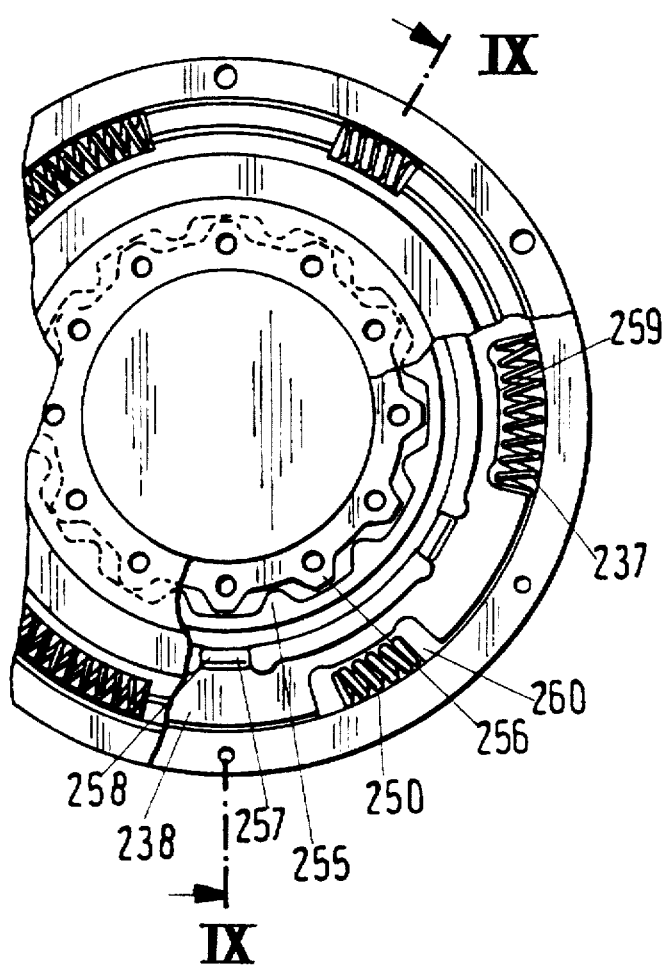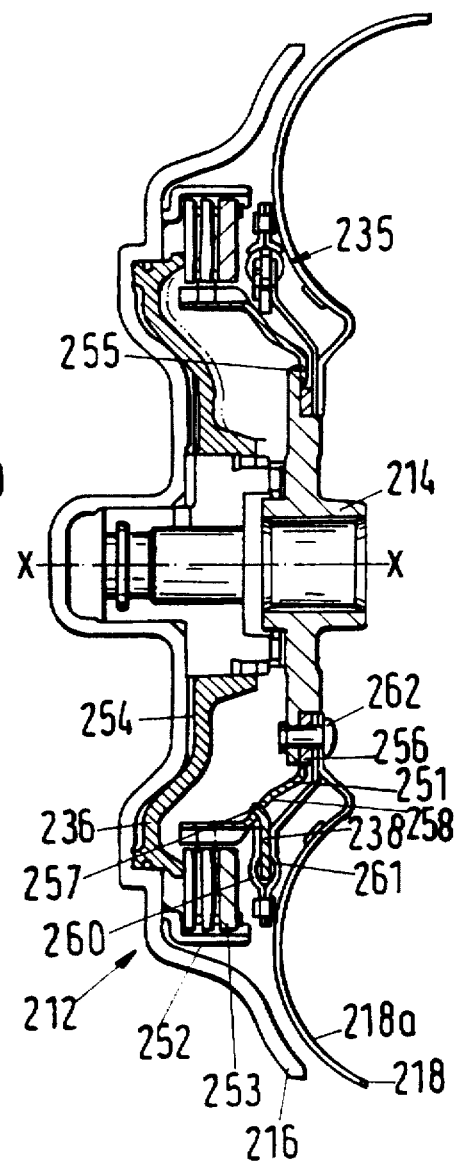
Fig. 8
Fig. 9

APPARATUS FOR UTILIZING AND OPERATING A HYDROKINETIC TORQUE CONVERTER WITH LOCKUP CLUTCH

BACKGROUND OF THE INVENTION

The invention relates to improvements in methods of, and in apparatus for, transmitting torque from a prime mover to one or more driven units, for example, for transmitting torque from a rotary output element (such as a crankshaft or a camshaft) of the engine to one or more wheels of a motor vehicle. More particularly, the invention relates to improvements in methods of, and in apparatus for, transmitting torque by way of a hydrokinetic torque converter which is equipped with a lockup clutch or bypass clutch. Still more particularly, the invention relates to improvements in methods of, and in apparatus for, transmitting torque by way of a hydrokinetic torque converter which can transmit torque by way of a turbine and/or by way of a slipping lockup clutch constructed and assembled to operate in parallel with the turbine. The invention also relates to a method of, and to means for, regulating the operation of a slipping lockup clutch for the purpose of ensuring that the magnitude of torque which the clutch can transmit is a function of then prevailing operating conditions.

In accordance with a presently preferred embodiment, the method of the instant invention can be practiced to regulate the operation of an apparatus which can be installed in the power train of a motor vehicle to transmit torque between the output element of the engine and the input element of an automatic transmission, and wherein the apparatus employs (a) a hydrokinetic torque converter having a turbine and a lockup clutch (such as a friction clutch) operating in parallel with the turbine, (b) means for monitoring one or more variable parameters and for generating and memorizing corresponding signals, and (c) means (such as a central computer or processor) for evaluating, processing and applying the signals to regulate the slippage of, as well as the transmission of, torque by the lockup clutch.

As a rule, a hydrokinetic torque converter which can be utilized in the novel apparatus and/or in accordance with the novel method comprises a pump, a turbine, a stator and a housing or cover which is driven by the rotary output element of a prime mover (such as the engine of a motor vehicle) and transmits torque to the pump. The cover is coaxial with the pump and with the turbine and defines a chamber which accommodates the turbine as well as a lockup clutch. The lockup clutch can transmit torque from the cover directly to the turbine or to a part which is driven by the turbine, and such clutch can constitute or include a friction clutch having a first friction surface on a substantially radially extending portion of the cover and a second friction surface provided on a piston which is movable in the cover in the axial direction of the turbine to move its friction surface into or away from frictional engagement with the first friction surface so that the magnitude of torque which the clutch can transmit depends on the extent of frictional engagement between the first and second surfaces. The second friction surface is normally provided on a radially outer portion of the piston, and the radially inner portion of such piston can transmit torque directly to the turbine or to a part (e.g., the rotary input element of a transmission which receives torque from the turbine or a hub which is of one piece with or is separably connected to the turbine and is also non-rotatably coupled to the input element) which receives torque from the turbine when the two friction surfaces of the lockup clutch are free to slide relative to each other.

Apparatus of the above-outlined character are disclosed, for example, in published German patent application No. 31 30 871, in U.S. Pat. No. 5,029,087 and in U.S. Pat. No. 4,577,737.

It is also known to regulate the operation of the lockup clutch in a conventional hydrokinetic torque converter by selectively varying the pressure in an internal chamber of the torque converter or by selectively varying the pressure differential between bodies of fluid in compartments at opposite sides of the aforementioned piston. The purpose of such regulation is to select those stages or phases of operation of the apparatus when the lockup clutch is called upon to transmit torque directly from the cover (i.e., from the output element of the prime mover) to the part or parts which are to receive torque from the turbine when the lockup clutch is not in use.

The aforementioned published German patent application No. 31 30 871 discloses a method which includes monitoring the slippage between the input and output members of the lockup clutch, comparing the thus ascertained values with preselected values of slip, and adjusting the operation of the lockup clutch when the monitored values depart from the preselected values. The German patent application proposes to adjust the operation of the lockup clutch by varying the pressure on a body of fluid in a chamber at one side of the axially movable piston of the lockup clutch until the difference between the RPM of the input member and the RPM of the output member of the clutch reaches a desired value, at least within a relatively low RPM range of the output element of the prime mover. In other words, the method which is proposed in the published German patent application is based on the well-known principle of regulating the slippage between the input and output members of the lockup clutch when the actual slippage departs from a predetermined slippage.

The disclosure of the U.S. Pat. No. 5,029,087 is analogous to that of the aforediscussed published German patent application No. 31 30 871, i.e., the U.S. reference also discloses a method of monitoring the slippage of the lockup clutch in the cover of a hydrokinetic torque converter, comparing the thus ascertained slippage with preselected values, and regulating the pressure of a body of fluid in a compartment of the torque converter in a sense to eliminate the differences between the actual slippage and the desired slippage of the lockup clutch. The patent further proposes to regulate the slippage of the lockup clutch in the aforedescribed manner while the RPM of the output element of the prime mover is within a relatively low range of revolutions per minute.

The disclosure in the U.S. Pat. No. 4,577,737 is also analogous to that of the published German patent application No. 31 30 871.

The proposals to regulate the operation of a lockup clutch in a manner as disclosed in the aforediscussed publications have met with limited commercial success or no commercial success at all. The reason for such absence of acceptance is believed to be that the aforementioned patents and the aforementioned patent application propose to regulate the slippage of the input and output members of a lockup clutch relative to each other while the RPM of the prime mover driving the cover of the hydrokinetic torque converter is relatively low, namely immediately above the idling speed of the prime mover. If the prime mover is the engine of a motor vehicle, the vehicle is likely to be operated, primarily or even exclusively, in such a way that the RPM of the output element of the engine is within the aforementioned relatively low range of rotational speeds. This means that, due to slippage of the input and output members of the lockup clutch in order to prevent the transmission of oscillations to the driven unit or units (such as an automatic transmission), the energy requirements (i.e., the fuel consumption) of the motor vehicle are increased accordingly. Furthermore, the slippage which is to take place while the RPM of the output element of the engine is relatively low (i.e., immediately or closely above the idling RPM) cannot be selected at will or with a requisite degree of accuracy because the operating parameters and operating conditions which respectively develop and take place at such low RPM of the output element of the engine cannot be relied upon to select the fluid pressure which is necessary to effect a slippage-free engagement of the lockup clutch. One of the reasons is that the pressure of fluid in the cover of the torque converter is low when the transmitted torque is relatively small and such low pressure of fluid cannot be regulated with the degree of accuracy which is needed to ensure that the slippage of the input and output members of the lockup clutch will vary with a degree of predictability which is needed to guarantee that the magnitude of torque being transmitted from the output element of the engine to one or more driven units in the power train of a motor vehicle will correspond to optimum torque for the prevailing operating conditions. It has been ascertained that, since the pressure of the fluid in the cover of the torque converter is relatively low when the magnitude of the transmitted torque is small, even minor fluctuations of fluid pressure are likely to entail pronounced variations of slippage between the driving and driven members of the lockup clutch. Furthermore, it is necessary to take into consideration the hysteresis of the valve or valves which are utilized in such torque converters to regulate the pressure of the fluid in the interior of the cover (e.g., the friction between the cylinder and the piston of a valve which forms part of the control for the torque converter), and such hysteresis renders it necessary to maintain a certain level of fluid pressure in order to account for the hysteresis. Otherwise stated, the accuracy of regulation of the torque which is being transmitted by the lockup clutch in conventional hydrokinetic torque converters decreases in response to a reduction of the magnitude of torque to be transmitted from a prime mover to one or more driven units, e.g., from the combustion engine to the transmission in a motor vehicle.

Another drawback of heretofore known proposals to regulate the operation of a lockup clutch or bypass clutch in a hydrokinetic torque converter is that, when the RPM of the output element of the engine is relatively low and the load upon the power train of the vehicle is also low (this takes place quite frequently when the RPM of the output element of the engine is not much higher than the idling RPM), low-amplitude fluctuations of transmitted torque often result in short-lasting adherence to one another of abutting friction surfaces of the input and output members of the lockup clutch at a time when the lockup clutch is supposed to slip. The intervals of adherence alternate with intervals of slippage, and such alternating slippage and adherence entail the generation of pronounced rattling and buzzing noises in the power train of a motor vehicle. Moreover, alternating intervals of adherence and slippage often initiate abrupt changes of the torque which is being transmitted to the input element of a transmission in the power train of a motor vehicle. The only heretofore known solution for such problems is to increase the slippage between the input and output members of the lockup clutch which, in turn, entails highly increased energy requirements for the engine.

Still another drawback of heretofore known proposals to regulate the slippage of a lockup clutch in a hydrokinetic torque converter in the power train between the prime mover and the transmission of a motor vehicle is that, when the RPM of the output element is relatively low (e.g., within a range immediately above the idling RPM), i.e., when the power train is under a mere partial load, the torque which is to be transmitted from the lockup clutch to the driven input element of a transmission or another driven unit of the motor vehicle can be reduced to the required value only with a considerable outlay for regulating equipment. The reason is that the magnitude of the torque to be transmitted under such circumstances is not dependent solely upon the clutch engaging force but also depends on the characteristics of the friction surfaces of the input and output members of the lockup clutch. Such characteristics of the friction surfaces, in turn, are a function of a number of different parameters including the temperature of the input and/or the output member, the RPM at which the friction surfaces are to slip relative to one another, the characteristics of the fluid (e.g., oil) in the cover of the hydrokinetic torque converter and/or certain other factors. Therefore, the characteristics of the friction surfaces are likely to fluctuate within a very wide range and, consequently, the means for regulating the slippage must be designed to take into consideration and to compensate for the influence of at least some if not all of the above-enumerated parameters. This is proposed to be accomplished by selecting a relatively high RPM at which the friction surfaces of the input and output members of the lockup clutch begin to slip relative to each other, namely to adhere to a relatively high minimum RPM at which the lockup clutch begins to slip. This is intended to ensure that the RPM at which the lockup clutch will begin to slip is sufficiently high to prevent the transmission of fluctuations of torque of the output element of the prime mover to the input element or elements of one or more units receiving torque from the turbine of the hydrokinetic torque converter or from the lockup clutch.

OBJECTS OF THE INVENTION

An object of the invention is to provide a hydrokinetic torque converter and a lockup clutch or bypass clutch which can be utilized in or with such torque converter to overcome the above-enumerated drawbacks of conventional hydrokinetic torque converters.

Another object of the invention is to provide a torque transmitting apparatus which embodies a hydrokinetic torque converter and a lockup clutch and which is constructed and assembled in such a way that it can reliably prevent the transmission of oscillations of torque from the output element of a prime mover to the input element or elements of one or more torque receiving units, for example, from the crankshaft or camshaft of a combustion engine or other engine to the input element of a transmission in the power train of a motor vehicle.

A further object of the invention is to provide a relatively simple, compact and inexpensive lockup clutch which can be utilized in or with the hydrokinetic torque converter in an apparatus of the above-outlined character.

An additional object of the invention is to provide a lockup clutch which can reliably and highly satisfactorily damp the fluctuations of torque which are being transmitted from a prime mover to the input member of the lockup clutch and from the output member of the lockup clutch to one or more driven units, e.g., to a transmission in the power train between the prime mover and one or more wheels of a motor vehicle, within the entire RPM range of the output element of the prime mover.

Still another object of the invention is to provide an apparatus which exhibits the above-enumerated features and advantages and which renders it possible to transmit torque from a prime mover to one or more driven units with considerable savings in energy requirements for the prime mover.

A further object of the invention is to provide a novel and improved method of transmitting torque from a prime mover to one or more driven units with a hydrokinetic torque converter and a lockup clutch or bypass clutch which is utilized with or forms part of the torque converter.

Another object of the invention is to provide a novel and improved method of regulating the slippage of a lockup clutch or bypass clutch in the cover of a hydrokinetic torque converter.

An additional object of the invention is to provide a novel and improved system for regulating the operation of a lockup clutch in a hydrokinetic torque converter which is installed in the power train between the prime mover and one or more wheels of a motor vehicle.

Still another object of the invention is to provide a power train which embodies the above-outlined torque transmitting apparatus.

A further object of the invention is to provide a motor vehicle which embodies the above-outlined power train with a hydrodynamic torque converter and a lockup clutch.

SUMMARY OF THE INVENTION

One feature of the present invention resides in the provision of an apparatus for transmitting torque from a rotary output element of a prime mover, such as an internal combustion engine in a motor vehicle. The improved apparatus comprises a hydrokinetic torque converter including a slipping lockup clutch or bypass clutch having or cooperating with a torsion damper whose torque capacity (i.e., the maximum torque which the damper can transmit) is less than the nominal (i.e., maximum achievable) torque of the prime mover.

The torque capacity of the damper can be between about 10% and 60% (preferably between about 25% and 50%) of the nominal torque of the prime mover.

The damper is or can be constructed and assembled in such a way that it is devoid of discrete friction generating means. For example, the damper can be constructed and assembled in such a way that it comprises rotary input and output members which are turnable relative to each other through an angle of between about ±2°, and ±8°, preferably between about ±3° and ±6°.

The damper can be designed with a view to ensure that its rigidity is between about 7 Nm/° and 30 Nm/°.

Another feature of the invention resides in the provision of a method of transmitting torque by a slipping lockup clutch or bypass clutch in a hydrokinetic torque converter which transmits torque to a transmission having at least one forward shift stage or speed ratio. The improved method comprises the step of regulating the transmission of torque by the lockup clutch as a function of variations of energy- and/or power-related parameters at least in the at least one forward shift stage or speed ratio of the transmission.

A further feature of the invention resides in the provision of a method of transmitting torque by a slipping lockup clutch or bypass clutch in a hydrokinetic torque converter which receives torque from an engine, such as an internal combustion engine in a motor vehicle. The method comprises the step of regulating the transmission of torque by the lockup clutch in two stages, one of which involves the transmission of torque within a range of between about 10% and 60% (preferably within a range of between about 15% and 50%) of a maximum torque being transmitted by the engine. The other stage involves the transmission of torque corresponding to not less than about 60% of the maximum torque transmitted by the engine.

The magnitude of torque which the clutch can transmit during the one stage can exceed the magnitude of torque being actually transmitted by the engine. For example, the magnitude of torque which the lockup clutch transmits during the one stage can be between 1 and at least 1.2 times the magnitude of torque being simultaneously transmitted by the engine.

An additional feature of the invention resides in the provision of an apparatus for transmitting torque from a rotary output element of an engine (e.g., the crankshaft or the camshaft of an internal combustion engine in a motor vehicle). The apparatus comprises a hydrokinetic torque converter including a slipping lockup clutch or bypass clutch and a torsional damper which is arranged to take up fluctuations (if any) of torque within a first range of torques transmitted by the output element of the engine. The lockup clutch is designed and is operative to slip in response to fluctuations of torque within a second range of torques which are being or which can be transmitted by the output element of the engine. Such apparatus can further comprise means for reducing the magnitude of torques which the damper can transmit within the first range of torques in response to pronounced oscillations of torque being transmitted by a power train which includes the torque converter. The means for reducing the magnitude can be constructed, assembled and operated to be responsive to resonance RPM and/or to changes of load upon the engine.

Still another feature of the invention resides in the provision of an apparatus for transmitting torque from a rotary output element of an engine. The apparatus comprises a hydrokinetic torque converter including a turbine, a slipping lockup clutch or bypass clutch having an input member receiving torque from the output element of the engine (e.g., by way of a cover or housing of the torque converter), and a torsional damper between an output member of the lockup clutch and the turbine. The damper has a torque capacity at least approximating an upper limit of a first range of a plurality of ranges of torque being transmittable by the engine. The minimum torque which can be transmitted by the lockup clutch at least within a portion of the first range of torques transmittable by the engine can equal or exceed 1% of the nominal torque of the engine. The lockup clutch can be designed in such a way that the torque which the clutch can transmit at least during a portion of the first range of torques transmittable by the engine is at least substantially constant.

At least the major part of the first range of torques transmittable by the engine is or can be transmitted within a main driving or operating range of the engine, namely a range of operations most frequently resorted to when the engine is in use, e.g., to drive the wheels of a motor vehicle. The major part of the first range of torques transmittable by the engine can be within a portion of the main driving range of the engine which encompasses at least one of an FTP75 cycle, i.e. U.S. Federal Test Procedure 75, and an ECE cycle, i.e. European Community Exhaust Testing Procedure, for urban traffic at a speed of 90 km/h and highway traffic at a speed of 120 km/h, it being assumed here that the engine is installed in a motor vehicle.

The first range of torques can be selected in such a way that it is being transmitted while the engine is driven within an engine RPM range of between idling RPM and about 3000 RPM, preferably between idling RPM and 2000–2500 RPM.

The aforementioned plurality of ranges further embraces a second range of torques transmittable by the engine. The torque transmitting capacity of the lockup clutch within the second RPM range of the engine can be between about 0.6 and 0.99 times (preferably between about 0.8 and 0.9 times) the actual torque being transmitted by the output element of the engine.

A further feature of the invention resides in the provision of an apparatus for transmitting torque from a rotary output element of an engine in a motor vehicle to a rotary input element of a variable-speed transmission having a plurality of speed ratios. The apparatus comprises a hydrokinetic torque converter including an engageable and disengageable lockup clutch, and means for monitoring the speed of the motor vehicle to ascertain whether or not a disengagement of the lockup clutch at a particular speed contributes to an increase of the towing or pulling force of the vehicle by way of the torque converter without a change in the speed ratio of the variable-speed transmission, to disengage the lockup clutch when such disengagement contributes to an increase of the towing or pulling force, and to shift the variable-speed transmission into a lower speed ratio when the disengagement of the clutch does not contribute to an increase of the towing or pulling force.

BRIEF DESCRIPTION OF THE DRAWINGS

The novel features which are considered as characteristic of the invention are set forth in particular in the appended claims. The improved torque transmitting apparatus itself, however, both as to its construction and the methods of using and operating the same, together with additional features and advantages thereof, will be best understood upon review of the following detailed description of certain presently preferred specific embodiments with reference to the accompanying drawings, wherein:

FIG. 8 is a fragmentary elevational view of a modified torsional damper which can be utilized in combination with a lockup clutch in a hydrokinetic torque converter forming part of a torque transmitting apparatus which embodies the present invention;

FIG. 9 is a sectional view substantially as seen in the direction of arrows from the line IX—IX of FIG. 8.

DESCRIPTION OF PREFERRED EMBODIMENTS

Figure 1:
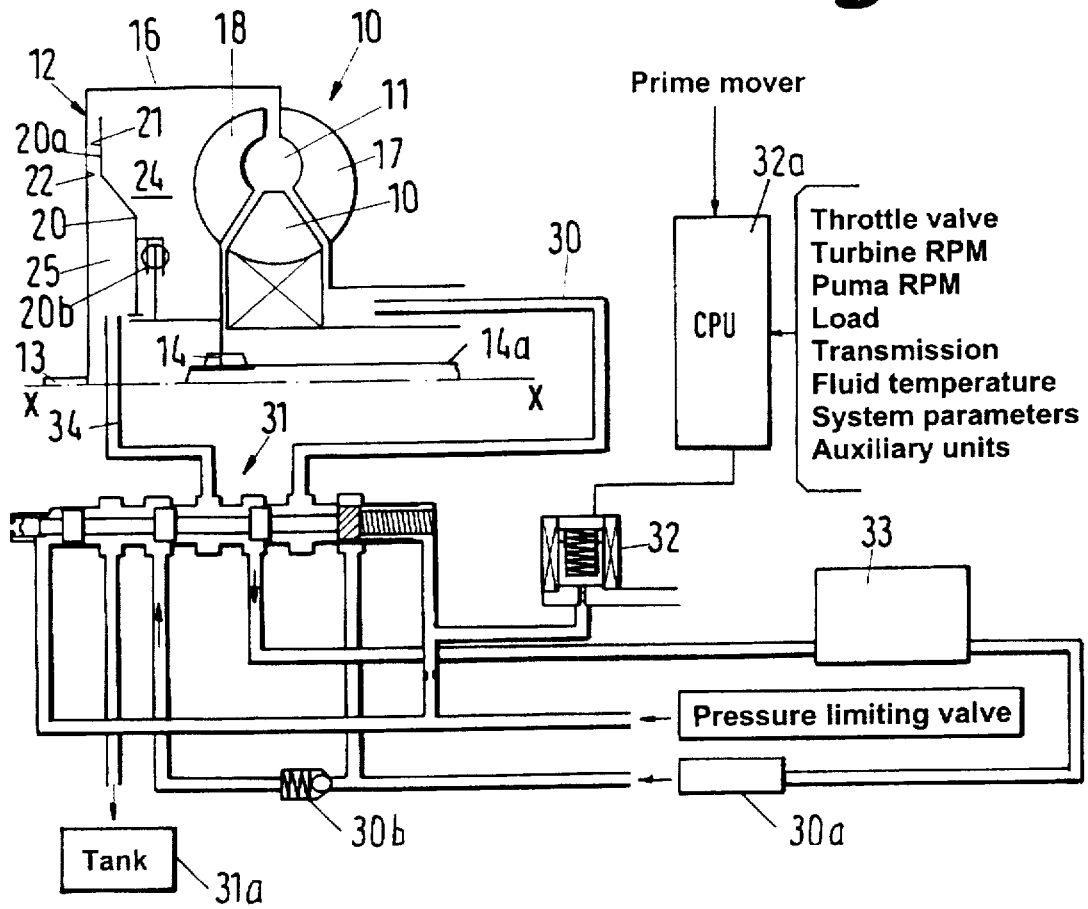
FIG. 1 is a fragmentary schematic partly elevational and partly axial sectional view of a torque transmitting apparatus employing a hydrokinetic torque converter and a lockup clutch which embody one form of the present invention.

FIG. 1 shows a torque transmitting apparatus 10 which comprises a hydrokinetic torque converter 11 having a lockup clutch or bypass clutch 12 which is operated by a pressurized fluid, such as oil. The clutch 12 is a friction clutch which operates in parallel with the turbine 18 of the torque converter 11. The cover or housing 16 of the torque converter 11 receives torque from the rotary output element 13 of a prime mover (not shown), such as the combustion engine of a motor vehicle. The output element of the torque converter 11 is shown at 14; this element can constitute a hub of the turbine 18 and can be provided with customary axially parallel internal splines and teeth mating with complementary external teeth and splines of a rotary input element 14a, e.g., the input shaft of a transmission in the power train between the engine (i.e., output element 13) and one or more wheels of a motor vehicle. The transmission including the shaft 14a can constitute an automatic variable-speed transmission having an output element arranged to transmit torque to an axle of the vehicle.

In addition to the housing 16 and the turbine 18, the torque converter 11 of FIG. 1 further comprises an impeller or pump 17 and a stator 19. The pump 17 receives torque from the cover 16 which, in turn, receives torque from the output element 13 of the prime mover. The stator 19 is located in the chamber of the cover 16 between the turbine 18 and the pump 17.

The lockup clutch or bypass clutch 12 which is shown in FIG. 1 is a friction clutch having a disc 20 with a friction surface 21 which confronts a second friction surface 22 on the adjacent radially extending portion of the cover 16. That portion of the disc 20 which is provided with the friction surface 20a constitutes a piston which is movable in the direction of the common axis X—X of the output element 13, turbine 18, cover 16, pump 17, output member or hub 14 and input shaft 14a. The piston 20a divides the internal chamber of the cover 16 into two compartments 24 and 25 located at opposite sides of the disc 20. The apparatus 10 further comprises a torsion damper 20b which is installed between the piston 20a (i.e., the disc 20) and the output member or hub 14. When the clutch 12 is engaged so that it transmits torque from the cover 16 directly to the hub 14, it operates in parallel with the torque converter 11 proper, i.e., with the turbine 18 in the chamber of the cover 16.

The torque converter 11 receives pressurized fluid from a source 30a (e.g., a pump) by way of a conduit 30 which discharges the fluid into the chamber of the cover 16 and more particularly into that portion of such chamber which is adjacent the pump 17. The means for regulating the pressure of fluid entering the conduit 30 includes a pressure regulating valve 31. The operation of the valve 31 is controlled by a regulating unit 32 (e.g., a proportional action valve or a pulse width modulated valve) which, in turn, is controlled by a computer 32a, e.g., a microprocessor (hereinafter called processor for short). The processor 32a regulates the operation of the valve 32 depending upon a plurality of variable parameters as well as characteristic curves stored in the memory of the processor 32a. The heated fluid which leaves the chamber of the cover 16 is caused to pass through a heat exchanger 33, and the thus cooled fluid can reenter the source 30a.

In addition to acting upon the turbine 18, the pressurized fluid entering the chamber of the cover 16 through the conduit 30 flows from the output side of the pump 17 into the compartment 24 at the right-hand side of the piston 20a (as viewed in FIG. 1). Pressurized fluid in the compartment 24 causes the piston 20a to move its friction surface 21 into engagement with the friction surface 22 of the adjacent radially extending portion of the cover 16.

In accordance with a feature of the invention, the clutch 12 is caused to slip at least during certain stages of operation of the torque transmitting apparatus 10. To this end, the pressure in the left-hand compartment 25 in the cover 16 of FIG. 1 is regulated by the valve 31 which is connected with the compartment 25 by a conduit 34. The valve 31 regulates the pressure of fluid in the compartment 25 in such a way that it determines the differential between the pressures of the fluid in the compartments 24 and 25 to thus determine the magnitude of torque which is being transmitted by the lockup clutch 12.

Since the lockup clutch 12 is installed to transmit torque in parallel with the turbine 18 of the torque converter 11, the torque ($M_{PM}$) which is being transmitted by the prime mover equals the sum of torques ($M_C$ and $M_P$) respectively transmitted by the clutch 12 and the pump 17. Furthermore, and if one disregards the losses developed in the power train, the torque ($M_T$) which is being transmitted to the input element 14a of the transmission equals the sum of $M_C$ and $M_{TU}$ (the latter being the torque which is being transmitted by the turbine 18). Otherwise stated, $M_T = M_C + M_{TU}$ or $M_C + M_P$ times conversion.

FIG. 1 further shows that the valve 31 includes a port which is connected to a tank 31a, that the connection between the source 30a and the valve 31 comprises a check valve 30b and that the processor 32a comprises inputs connected to devices which generate signals denoting the position of the valving element of the throttle valve in a motor vehicle, the RPM of the turbine, the RPM of the pump, the load upon the engine, the setting of the transmission including the input shaft 14a, the temperature of fluid in the chamber of the cover 16, one or more other parameters of the torque transmitting system, and the condition and/or other parameters of one or more auxiliary units.

Figure 2:
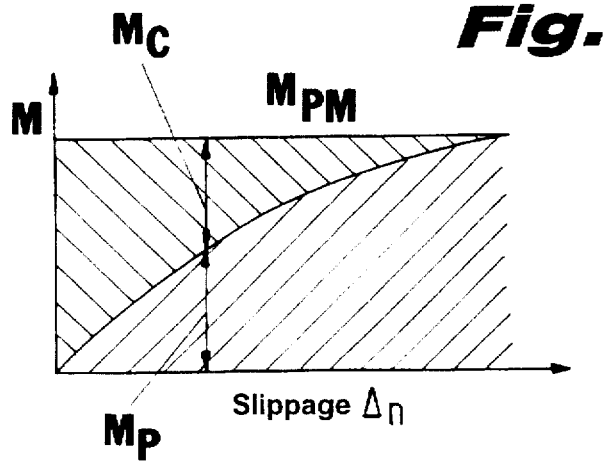
FIG. 2 is a diagram showing the mode of transmitting torque in part by way of the hydrokinetic torque converter and in part by way of the lockup clutch of the apparatus which is shown in FIG. 1.

FIG. 2 is a diagram showing the relationship of the torque M to the slippage ($\Delta n$) of the lockup clutch 12. It will be seen that the magnitude of the torque which is transmitted by the turbine 18 to the hub 14 increases when the slippage of the lockup clutch 12 increases. In accordance with one feature of the method of the present invention, the slippage of the clutch 12 is not regulated directly when slippage is desired. Instead, the slippage is regulated depending on the operating condition of the prime mover, including or driving the rotary output element 13. The condition of the prime mover is monitored by at least one signal generating device which, in turn, transmits signals to the corresponding input of the processor 32a so that the latter induces the valve 31 to select a desired differential between the pressures of fluids in the compartments 24 and 25 within the cover 16. The desired slippage between the surfaces 21, 22 of the lockup clutch 12 is thereupon determined automatically, i.e., without manual adjustment of the valve 31.

Figure 3:
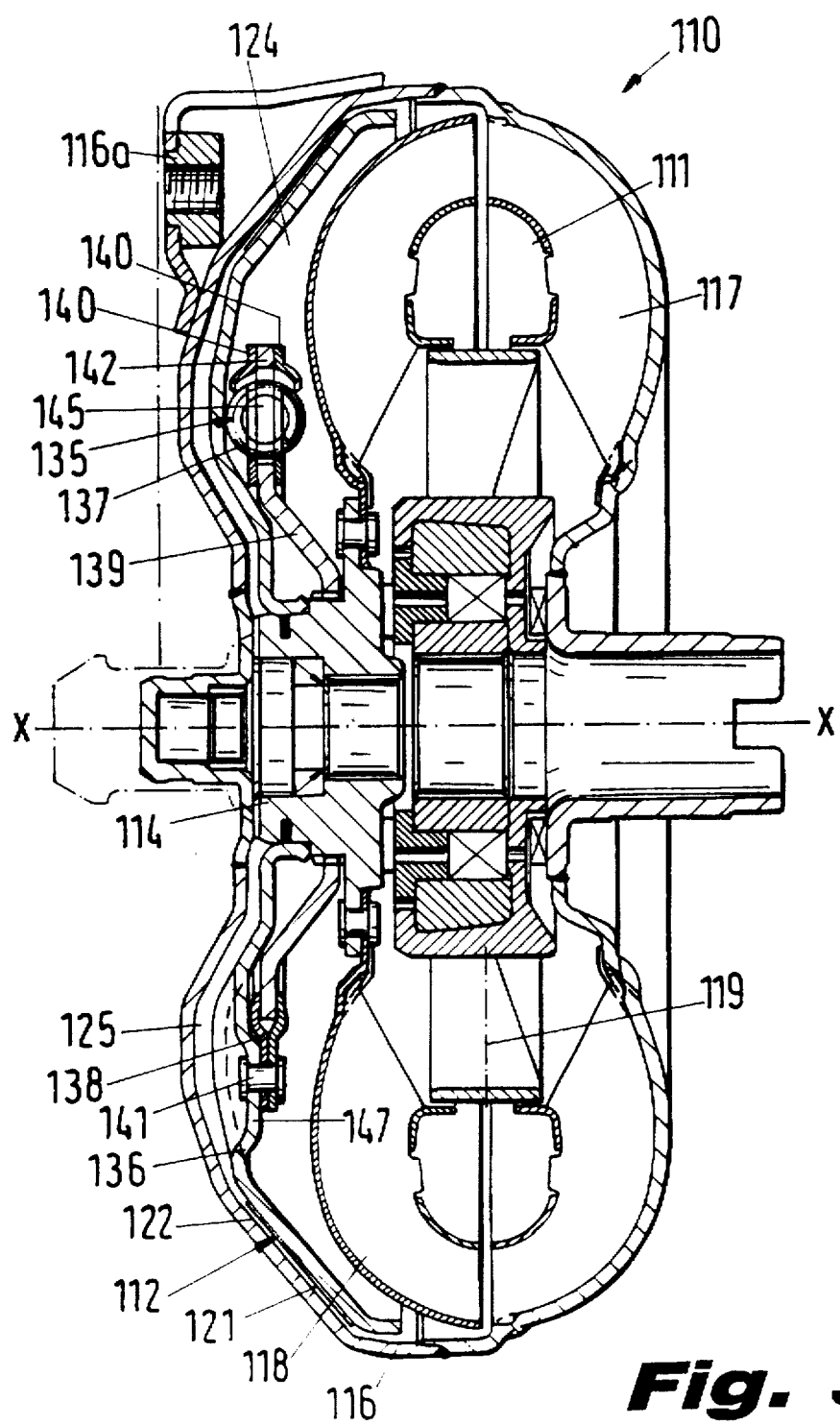
FIG. 3 is an axial sectional view of a specific embodiment of a torque transmitting apparatus which embodies the present invention and wherein the lockup clutch transmits torque to the turbine of the hydrokinetic torque converter by way of a novel and improved torsional damper.

The torque transmitting apparatus 110 of FIG. 3 comprises a hydrokinetic torque converter 111 with a lockup clutch 112 and a damper 135 which is installed between the clutch 112 and the hub 114 of the turbine 118 forming part of the torque converter 111. The torque converter 111 further comprises a cover 116 which is driven by the engine of a motor vehicle by way of fasteners 116a and drives the impeller or pump 117. The stator 119 of the torque converter 111 is installed between the pump 117 and the turbine 118. The fasteners 116a (only one shown in FIG. 3) serve to secure the cover 116 of the torque converter 111 to a disc (not shown) on the rotary output element (e.g., a crankshaft or a camshaft) of the combustion engine.

The lockup clutch 112 of FIG. 3 comprises an annular piston 136 whose axis coincides with the axis X—X of the torque converter 111 and which is installed between the cover 116 and the turbine 118. The piston 136 is or can be made of metallic sheet material, and its radially inner portion is non-rotatably but axially movably mounted on the hub 114 of the turbine 118. The radially outer portion of the piston 136 constitutes a conical frustum and is provided with a friction lining 121 having an exposed friction surface confronting the friction surface 122 of the adjacent frustoconical portion of the cover 116.

The piston 136 is disposed between a compartment 124 and a compartment 125 forming part of the chamber of the cover 116. The compartment 124 is disposed between the piston 136 and the turbine 118, and the compartment 125 is disposed between the piston and the cover 116. The means for changing the axial position of the piston 136 includes means for varying the pressure of fluid in the compartment 125, namely for varying the differential between the pressures of the fluids in the compartments 124 and 125. The magnitude of the torque $M_C$ which is being transmitted by the lockup clutch 112 is a function of such pressure differential.

The construction and mounting of the damper 135 are such that the torque capacity or stop pin torque of the damper is less than the nominal torque of the combustion engine which drives the cover 116. In other words, the damper 135 begins to act not unlike a solid body when the magnitude of the torque transmitted by the lockup clutch 112 is still less than the maximum torque which the engine can transmit to the cover 116 of the torque converter 111. Stated in still another way, the input member 138 of the damper 135 ceases to move relative to the flange-like output member 139 of the damper before the magnitude of the torque $M_{PM}$ which is being transmitted to the cover 116 by the combustion engine of the vehicle in which the torque transmitting apparatus is installed reaches a maximum value. This can be achieved in a number of different ways. For example, the convolutions of the coil springs 137 forming part of the damper 135 can be caused to fully abut each other so that the springs 137 act not unlike one-piece solid bodies, or the input and output members 138, 139 of the damper 135 can be provided with stops which come into abutment with each other before the magnitude of the torque $M_{PM}$ being transmitted to the cover 116 reaches a maximum value. The input member 138 of the damper 135 is non-rotatably secured to the piston 136, and the output member 139 of the damper 135 is non-rotatably but axially movably coupled to the hub 114 of the turbine 118. To this end, the output member 139 is provided with a set of internal axially parallel teeth mating with complementary axially parallel external teeth of the hub 114.

Figure 4:
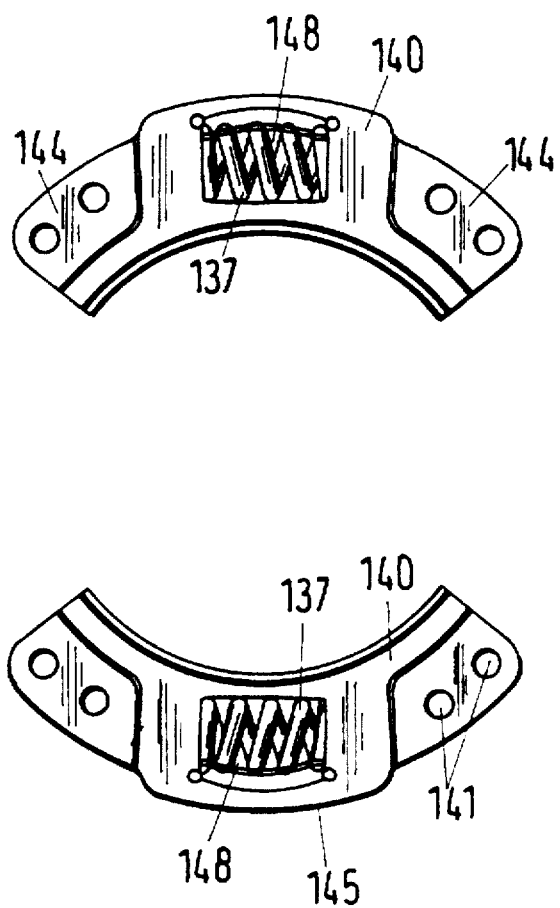
FIG. 4 is an elevational exploded view of the input member of the damper which is shown in FIG. 3.
Figure 5:
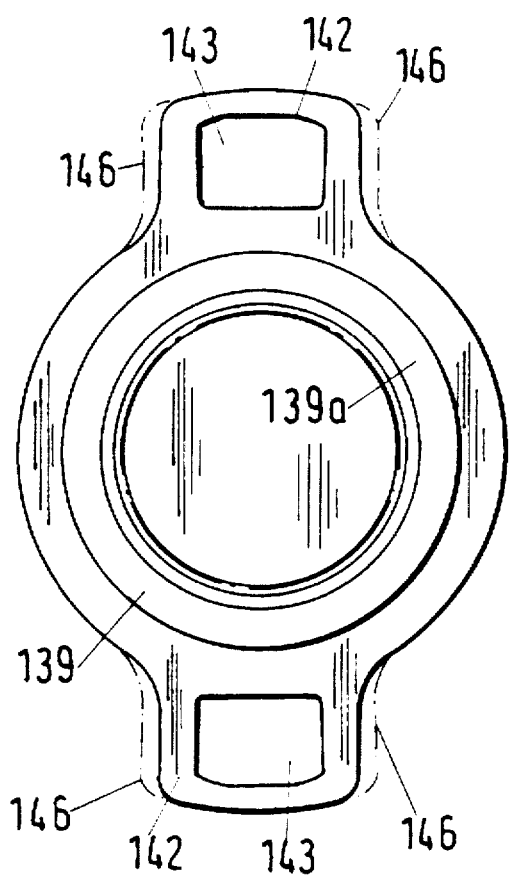
FIG. 5 is an elevational view of the output member of the damper which is shown in FIG. 3.

FIGS. 4 and 5 illustrate the details of a damper 135 which can be utilized in combination with the lockup clutch 112. The input member 138 of the damper 135 comprises a plurality of segment-shaped sections 140, namely a first pair of sections 140 which confront each other at one side of the axis X—X and a second pair of sections 140 confronting each other at the other side of the axis X—X diametrically opposite the sections 140 of the first pair. The sections 140 of each pair of sections are affixed to the piston 136 by one or more rivets 141 and/or other suitable fasteners.

FIG. 5 shows the flange-like output member 139 of the damper 135. This output member comprises an annular main portion 139a which carries two radially outwardly extending arms 142 disposed diametrically opposite each other. The arms 142 have windows 143 for the energy storing elements 137 of the damper 135. Each arm 142 is disposed between a pair of sections 140 (see FIG. 3). To this end, the sections 140 of each pair are provided with confronting pockets 145 jointly defining a receptacle or socket for the respective arm 142. The dimensions of the pockets 145 are selected in such a way that the input and output members 138, 139 of the damper 135 have limited freedom of angular movement relative to each other. This is shown in FIG. 5 wherein the two end positions of each of the arms 142 relative to the respective pair of sections 140 are indicated by phantom lines, as at 146.

The piston 136 is provided with an annulus of circumferentially spaced apart axial projections 147 (FIG. 3) which extend toward the turbine 118 and abut circumferentially spaced apart portions 144 (FIG. 4) of the immediately adjacent sections 140 of the input member 138. The rivets 141 secure the portions 144 of the sections 140 forming part of the input member 138 to the adjacent axial projections 147 of the piston 136.

The median portions of the sections 140 forming part of the input member 138 are provided with windows 148 for the adjacent energy storing elements 137. The windows 148 are in accurate axial alignment with the windows 143 in the arms 142 of the output member 139 and the dimensions of the windows are selected in such a way that the energy storing elements 137 are received therein without play, i.e., each energy storing element 137 begins to store energy (or to store additional energy) as soon as the input and output members 138, 139 begin to turn relative to each other, i.e., as soon as the arms 142 of the output member 139 begin to leave their central positions in the respective pairs of pockets 145. However, it is equally within the scope of the invention to select the dimensions of the energy storing elements 137 and/or the dimensions and relative positions of the windows 143 and 148 in such a way that at least one of the elements 137 is received in the respective windows 143, 148 with at least some clearance. Furthermore, at least one of the energy storing elements 137 can be installed in the respective windows 143 and 148 in at least slightly prestressed condition. Such expedients render it possible to select the manner in which the energy storing elements 137 undergo compression and/or additional compression while the input and output members 138, 139 of the damper 135 turn relative to each other.

An important advantage of the improved dampers 20b and 135 is that they need not be designed to transmit the nominal torque of the engine. This simplifies the construction and contributes to lower cost for such dampers.

Figure 6:
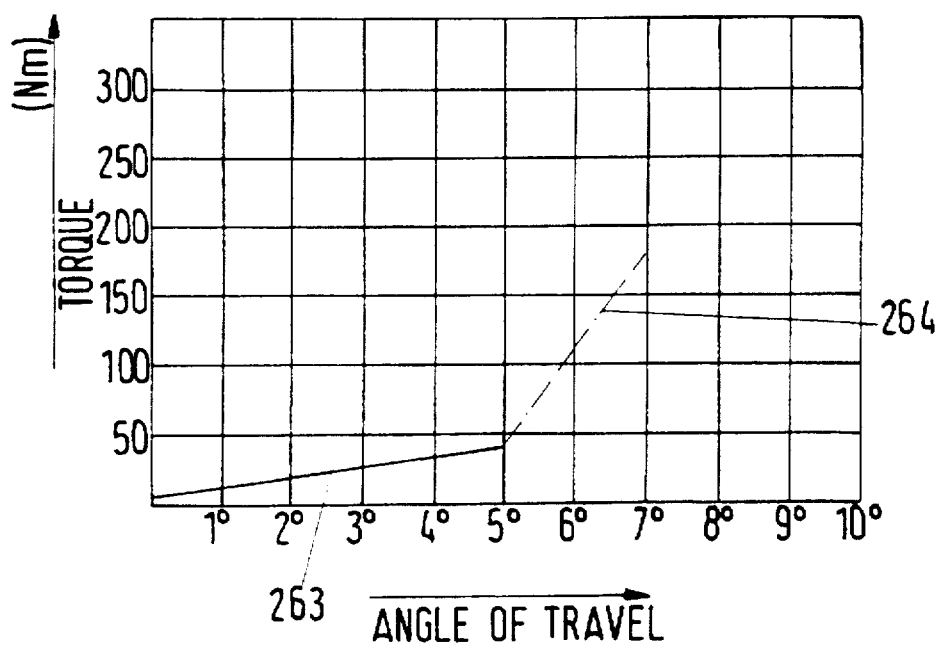
FIG. 6 is a diagram showing the characteristic curve of a multi-stage damper which can be utilized in the improved torque transmitting apparatus.

By way of example, the damper 135 of FIGS. 3 to 5 can be designed in such a way that its energy storing elements 137 can transmit between approximately 40% and 50% of the nominal (maximum) torque $M_{PM}$ of the engine which drives the cover 116 of the torque converter 111. As can be seen in FIG. 6 the angular movability of the input and output members 138, 139 of the damper 135 relative to each other can be selected in such a way that it need not exceed approximately 5°. FIG. 6 shows the extent of angular movability of the input and output members 138, 139 relative to each other while the engine of the motor vehicle is in the process of pulling a load (as contrasted with coasting). The extent of relative movement of the input and output members 138, 139 during coasting of the engine can, but need not, be the same as while the engine is in the process of pulling a load. Furthermore, it is also within the scope of the invention to select the characteristics of the energy storing elements 137 in such a way that the resistance of these elements to relative movement of the input and output members 138, 139 during coasting is different from the resistance when the engine is called upon to pull a load. This can be readily accomplished by appropriate dimensioning of the windows 143 and/or 148 and/or by appropriate selection of the characteristics of the energy storing elements 137. Still further, the torsional damper 135 can be designed in such a way that it is provided with a multi-stage characteristic curve; for example, one stage of such characteristic curve is or can be effective while the engine is in the process of pulling a load and another stage of such characteristic curve is or can be effective while the vehicle, wherein the power train between the engine and one or more wheels includes the structure of FIGS. 3 to 5, is coasting.

FIG. 6 further shows that the damper 135 becomes ineffective when the angular displacement of the input and output members 138, 139 of the damper exceeds approximately 5° as well as that the magnitude of torque which can be transmitted while the energy storing elements 137 of the damper store additional energy does not exceed approximately 45 Nm. Such a damper 135 can be utilized with advantage in conjunction with hydrokinetic torque converters which employ or cooperate with a slippage-regulated lockup clutch. The torque capacity of approximately 45 Nm is particularly suitable when the damper is installed in the power train of a vehicle driven by an engine having a nominal torque in the range of between 80 Nm and 200 Nm.

The torque capacity of the damper 135 is preferably selected in such a way that it covers the entire main driving range of the motor vehicle having a power train between the engine and the transmission, and employing a damper of the above-outlined character. The term main driving range is intended to embrace that range of operation of a motor vehicle which is most frequently resorted to during the useful life of the vehicle or its engine. Such main driving range preferably embraces at least those ranges of the characteristic performance of the engine which are relevant for the FTP75 cycle and/or for the ECE cycle (90 km/h and 120 km/h in city traffic). Thus, the main driving range can be characterized as that range which is most likely to be in effect when the vehicle is in use. The range can vary from country to country in order to account for specific regulations and traffic infrastructures in the respective countries.

Figure 7:
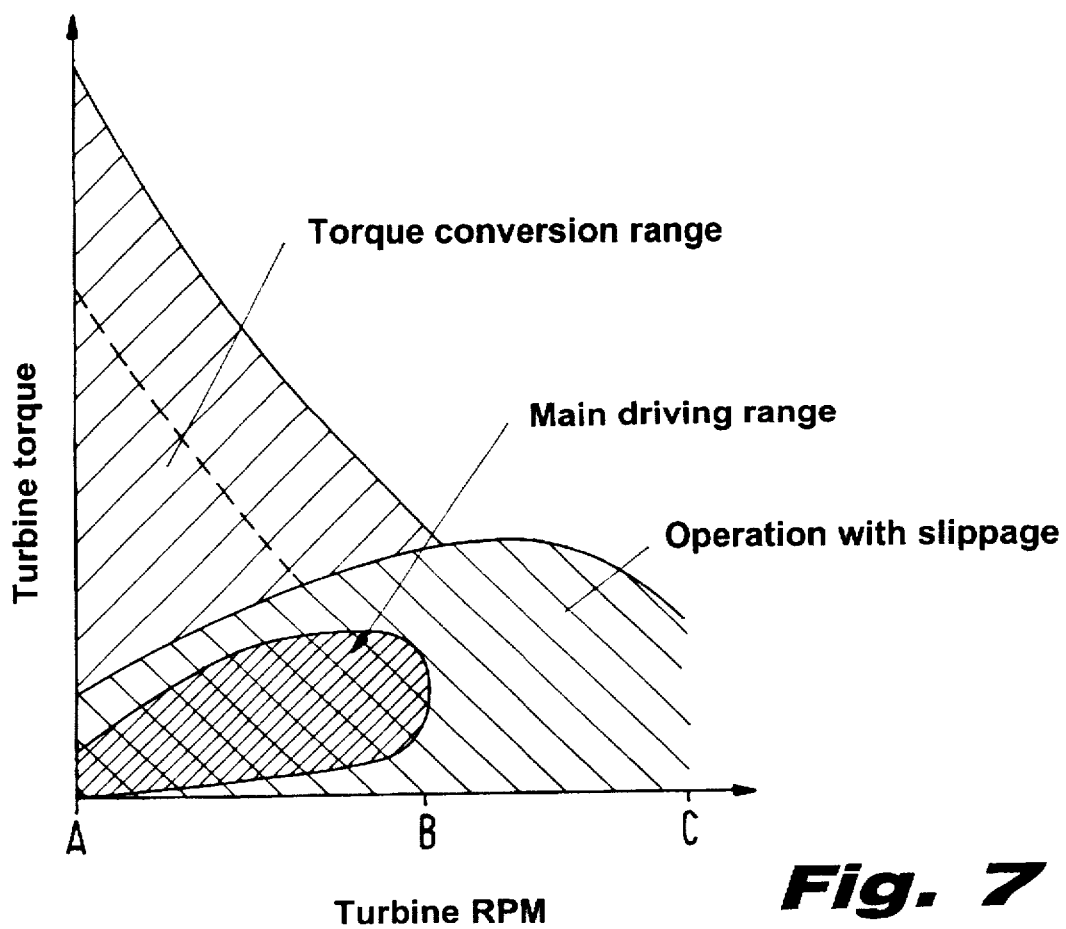
FIG. 7 is a diagram showing the range of operation of the lockup clutch with slip and the main driving or operational range of a conveyance in which the slip clutch is put to use.

The diagram of FIG. 7 illustrates the characteristic output curves of a torque transmitting apparatus corresponding to that of FIGS. 3 to 5, i.e., an apparatus employing a so-called "soft" hydrokinetic torque converter. The aforediscussed main driving range is denoted by cross hatching with closely adjacent lines. FIG. 7 further shows the torque converting range of the torque converter 111. The lockup clutch 112 is not engaged within the torque converting range of the torque converter 111. The hatching denoting the main driving or operating range is surrounded by a hatching denoting that range of operation of the motor vehicle when the lockup clutch 112 is preferably operated with at least some (e.g., minimal) slip. The main driving or operating range extends from a lower RPM A to an upper RPM B. The lower RPM A can correspond, at least substantially, to the idling RPM of the engine (e.g., an RPM in the range of between about 700 RPM and 800 RPM). The upper RPM B can be within the range of between about 2000 RPM and 3000 RPM, e.g., close to or matching 2200 RPM. The slippage of the lockup clutch 112 can be selected in such a way that it ceases at an RPM C, e.g., an RPM which can match or approximate the maximum RPM of the engine. However, it is presently preferred to select the upper limit C in such a way that it is less than the maximum RPM of the engine; for example, the upper limit C can be between about 3000 RPM and 4000 RPM.

FIG. 7 shows that the improved torsion damper 135 can be designed and mounted in such a way that the transmission of torque takes place only by way of the lockup clutch 112, i.e., it is not necessary to transmit torque to the hub 114 by way of the cover 116, pump 117 and turbine 118 because the lockup clutch 112 operates without slip within the entire main driving or operating range of the motor vehicle. The energy storing elements 137 of the damper 135 prevent the transmission of any oscillations of torque from the output element 113 of the engine to the input shaft of the transmission while the motor vehicle is operated within the main driving range. At the very least, the energy storing elements 137 prevent the transmission of any appreciable oscillations of torque from the engine to the transmission. The lockup clutch 112 serves merely to operate with slip in order to compensate for peaks of oscillations of the torque that is being transmitted by the output element of the engine. To this end, the operation of the lockup clutch 112 within the main driving range of the motor vehicle is regulated in such a way that the maximum torque which can be transmitted via the lockup clutch is a relatively small fraction of the nominal torque of the engine, but that the maximum torque which the lockup clutch can transmit is larger than the torque actually being transmitted by the engine to the cover 116 of the hydrokinetic torque converter 111.

That range of operation of the lockup clutch 112 within which the friction surfaces 121 and 122 are caused to slip relative to each other is regulated in such a way that the piston 136 and the cover 116 can turn relative to each other, i.e., that a certain angular displacement takes place between the turbine 118 and the pump 117. FIG. 7 shows that, when the lockup clutch 112 is operated with slip, it can prevent the transmission of any undesirable fluctuations of torque from the cover 116 to the hub 114 of the turbine 118.

When the operation of the motor vehicle is within the main driving range as well as when the lockup clutch 112 is operated with slip, undesirable pronounced fluctuations of torque cannot be transmitted to the input element of the transmission by the expedient of reducing the magnitude of torque which can be transmitted by the lockup clutch. Such pronounced fluctuations of torque are likely to develop, for example, due to resonance, to an abrupt change of the load and/or for certain other reasons.

Referring again to FIG. 6, the damper 135 between the lockup clutch 112 and the hub 114 of the turbine 118 can be designed in such a way that the relatively large angle (of about 5°) within which the friction surfaces 121 and 122 offer a relatively low resistance to angular movements of the piston 136 and cover 116 relative to each other is followed by a relatively small angle (e.g., about 2°) of much more pronounced resistance to angular movement of the components 135 and 116 relative to one another. For example, the pronounced resistance can be several times the relatively low resistance. The relatively small angle can be greater or less than about 2°). It is presently preferred to select the pronounced resistance in such a way that it is between about seven and fifteen times the relatively low resistance. As can be seen in FIG. 6, the relatively low resistance is or can be about 8 Nm/° and the more pronounced resistance is or can be in the range of about 70 Nm/°.

The magnitude of torque which can be transmitted by the lockup clutch 112 within the main driving range (FIG. 7) of the motor vehicle can be selected in such a way that it is between 1.1 and 1.2 times the actual engine torque. The torque which can be transmitted by the clutch 112 within the main driving range of the motor vehicle, can be regulated in such a way that it is not or need not be reduced below a preselected lower threshold value. Such a value should not be less than 1% of the nominal torque of the combustion engine. For example, the aforementioned lower threshold value can be in the range of about 5 Nm. However, and depending upon the circumstances of operation of the motor vehicle, the lower threshold value can be higher or lower than 5 Nm. Thus, the minimum torque which the lockup clutch 112 can transmit within the main driving range of the motor vehicle can be selected in such a way that it is close to, and preferably somewhat less than, the maximum engine torque which is being transmitted by the output element within the main driving range of the vehicle.

When the lockup clutch 112 is operated with slip (refer again to FIG. 7), the torque which can be transmitted by the clutch can be selected to amount to between about 0.8 times and 0.95 times the momentary engine torque. Thus, the ability of the lockup clutch 112 is or can be dependent upon the momentary engine torque, i.e., upon that torque which is to be transmitted by the apparatus 110. Otherwise stated, the torque which the lockup clutch 112 should transmit increases in response to increasing magnitude of the torque being transmitted by the output element of the engine. Inversely, the magnitude of torque being transmitted by the lockup clutch 112 decreases in response to decreasing engine torque.

FIGS. 8 and 9 illustrate a modified lockup clutch 212 which is installed in a hydrokinetic torque converter having a cover or housing 216 and a turbine 218 with a hub 214. The lockup clutch 212 comprises a multiple-stage torsional damper 235 having a first set of energy storing elements 237 and a second set of energy storing elements 250. The illustrated energy storing elements 237 and 250 are coil springs.

The illustrated lockup clutch 212 is a multidisc clutch having a radially inner disc carrier 251 and a radially outer disc carrier 252. The latter is non-rotatably affixed to the cover 216 of the hydrokinetic torque converter. That portion of the disc carrier 252 which is nearer to the turbine 218 of the torque converter supports a plate-like stop 253. The cover 216 of the torque converter and the piston 236 of the lockup clutch 212 define a compartment 254 which constitutes a plenum chamber and can receive a body of hydraulic fluid. The pressure in the compartment 254 determines the magnitude of the torque which is to be transmitted by the lockup clutch 212.

The disc carrier 251 of the multiple-stage damper 235 constitutes the output member of the lockup clutch 212 and its radially inner portion is provided with an annulus of axially parallel teeth 255 mating with clearance with the external teeth 256 provided on the hub 214 of the turbine 218, i.e., on the output element of the hydrokinetic torque converter. The external teeth 256 are (or can be) provided on a spur gear which is made of sheet metal and is riveted (as at 262) or otherwise non-rotatably affixed to the hub 214.

The multistage damper 235 further comprises an input member 238 which is connected with the aforementioned disc carrier or output member 251 of the lockup clutch 212. The input member 238 of the multistage damper 235 is an annular component which is provided with radially inwardly extending tongues or prongs 257 received in slit-shaped recesses 258 provided in the output member 251 of the lockup clutch 212. The tongues or lugs 257 are received in the respective recesses 258 in such a way that they establish a practically clearance-free connection between the output member 251 of the lockup clutch 212 and the input member 238 of the damper 235, i.e., the parts 238 and 251 are coupled to each other for rotation about the axis X—X of the lockup clutch 212 and the hydrokinetic torque converter including the cover 216 and the turbine 218. FIG. 8 shows that the input member 238 of the damper 235 is provided with windows 259, 260' for the energy storing elements 237 and 250, respectively. The dimensions of the windows 260' and of the energy storing elements 250 are selected in such a way that the elements 250 are received in the respective windows 260' with clearance in clockwise and counterclockwise directions. The annular input member 238 is disposed between two discs or lamellae 260 and 261 of the lockup clutch 212. The discs 260, 261 have confronting cupped portions at the radially outer portion of the input member 238 and are riveted to one another radially outwardly of the member 238 (see FIG. 9).

The disc 261 is adjacent the turbine 218 and extends radially inwardly all the way to the hub 214 and is non-rotatably affixed to such hub by the aforementioned rivets 262. FIG. 9 shows that the rivets 262 serve as a means for non-rotatably affixing the disc 261, the gear 256 and the shell 218a of the turbine 218 to the hub 214.

The characteristic curve of the torsional damper 235 can correspond to that indicated by the lines or curves 263 and 264 in the diagram of FIG. 6.

The curve 263 denotes that range of operation of the damper 235 which involves the storage of energy (or additional energy) by the energy storing elements 237. When the extent of relative angular displacement of the input member 238 and the output member 251 of the damper 235 exceeds 5°, the range of operation of the energy storing elements 250 begins (curve 264 in FIG. 6), i.e., the elements 250 begin to store energy (or additional energy) simultaneously with further stressing of the energy storing elements 237. The resistance of energy storing elements 250 to deformation (or to additional deformation) can exceed, even considerably, the resistance of the energy storing elements 237. This is indicated by the slope of the curve 264 in the diagram of FIG. 6, i.e., the slope of the curve 264 is much more pronounced than that of the curve 263. When the total extent of relative angular displacement of the input and output members 238 and 251 exceeds 7° (reference being had again to FIG. 6), the internal teeth 255 of the output member 251 engage the adjacent external teeth of the gear 256 on the hub 214 to thus establish a form-locking connection between the output member 251 and the hub 214. All this takes place while the input member 238 turns relative to the output member in one direction. Thus, the damper 235 is at least substantially bypassed when the teeth 255 of the output member 251 begin to transmit torque directly to the teeth of the gear 256 because the transmission of torque no longer takes place by way of the energy storing elements 237 and 250. Such a design of the damper 235 is desirable and advantageous because the stressing of the energy storing elements 237, 250 cannot exceed a preselected value. The same applies for the application of stresses to the input member 238 and discs or lamellae 260, 261.

The aforedescribed novel design and mode of operation of the lockup clutch 12, 112 or 212 and of the damper 20b, 135 or 235 exhibit the important advantage that they render it possible to considerably reduce the energy requirements of a motor vehicle embodying a power train which includes the improved torque transmitting apparatus. Considerable reductions of the energy requirements of such motor vehicle are attributable to the fact that, when the motor vehicle is operated within the main driving range, the lockup clutch is operated without slippage. This is in direct contrast to heretofore known proposals according to which the lockup clutch is to be operated with slippage within the main driving or operating range of the motor vehicle. In many instances the main driving range is between approximately 600 RPM (lower limit) and 2200–3000 RPM (upper limit). The average RPM within such a main driving range is or can be approximately 1800 revolutions per minute. In accordance with the instant invention, the lockup clutch 12, 112 or 212 operates without slippage within the entire (or at least within the major part of the) main driving range of the motor vehicle. Accordingly, the entire torque which is being transmitted by the output element of the prime mover is transmitted to the input element of the transmission without any, or with minimal, slippage of the lockup clutch. Damping of oscillations (if any) of transmitted torque is effected by the damper 20b, 135 or 235. As already described hereinbefore, the angle of relative rotation of the input and output members of the damper is relatively small; when such angle is reached, the damper acts not unlike a rigid body and this preferably takes place at the upper limit of the main driving range of the motor vehicle. Depending on the characteristics (such as the horsepower) of the combustion engine or other engine and the weight of the motor vehicle, the upper limit of the main driving range can amount to between about 15% and 50% of the nominal torque of the engine.

A damper which is constructed, assembled, installed and operated in the aforedescribed manner exhibits the additional advantage that it eliminates or at least greatly reduces the likelihood of the development of humming, buzzing and like undesirable noises. This is due to the fact that the damper can compensate for oscillations of the torque which is being transmitted by the output element of the engine when the magnitude of such torque is relatively low. Furthermore, the feature that the maximum angle of displacement of the input and output members of the damper relative to each other is rather small ensures that any undesirable reaction of the power train to changes in load is minimal or is fully compensated for by the damper and/or clutch. Shocks which are attributable to changes in load are limited or fully compensated for because, when the upper limit of the ability of the damper to absorb oscillations of transmitted torque is reached or exceeded, the friction surfaces of the lockup clutch begin to slip relative to each other to thus limit the magnitude of the torque which can be transmitted by the combination of lockup clutch and torsional damper. Peaks of transmitted torque are absorbed by the lockup clutch in that the friction surfaces of the clutch simply turn relative to each other.

If the magnitude of torque which is being transmitted by the output element of the engine or another prime mover exceeds the upper limit of the torque which is being transmitted within the main driving range of the motor vehicle, the friction surfaces of the lockup clutch slide relative to one another; this ensures that the slippage of the lockup clutch compensates for undesirable reactions which are attributable to pronounced changes of load.

When the RPM of the engine is within a range above the main driving range of the motor vehicle, the lockup clutch preferably becomes engaged in response to the transmission of a torque which is greater than the momentary torque transmitted by the output element of the engine, provided that the transmitted torque is not caused to oscillate beyond a selected range. If undesirable oscillations develop within certain RPM ranges of the output element of the engine, the lockup clutch is preferably designed to operate with slip. Such a mode of operation of the lockup clutch can be resorted to with particular advantage when the RPM matches or approximates the resonance RPM.

It is also possible, and often desirable, to disengage the lockup clutch, or to considerably reduce the magnitude of torque which can be transmitted by the lockup clutch, within the main driving range of the motor vehicle, i.e., when the torque being transmitted by the output element of the engine is relatively small, for example, when the RPM of the engine matches or approximates the resonance RPM.

The aforedescribed construction and mode of operation of the improved lockup clutch and of the combination of such lockup clutch with the aforedescribed damper render it possible to eliminate (or at least minimize) the humming and other noises which develop when a conventional lockup clutch is operated with slip, namely when the friction surfaces of a conventional clutch are caused to move relative to each other in such a way that intervals of slippage alternate with intervals of adherence of neighboring friction surfaces to each other.

The features which are shown in the drawings can be combined with and/or substituted for each other without departing from the spirit of the invention. The same applies for the various methods of assembling the improved torque transmitting apparatus, of operating the apparatus, of designing and operating the lockup clutch and of designing and operating the torsional damper. The same holds true for a combination of heretofore described apparatus with those described and shown in the commonly owned German patent application No. 43 28 182.6.

The manner in which the output element of an engine can be attached to the cover of the torque converter and/or the manner of establishing a torque transmitting connection between the turbine and the input element of a transmission forms no part of the present invention. The same applies for the details of various valves which can be utilized to regulate the flow of fluid into and from the housing of the torque converter.

The improved damper 20b, 135 or 235 exhibits a number of important advantages. Thus, the damper can absorb or compensate for at least a high percentage of those oscillations and/or other undesirable variations or fluctuations of torque which are transmitted by the lockup clutch 12, 112 or 212. At any rate, the damper can absorb or filter the undesirable variations or fluctuations or oscillations of torque being transmitted by the lockup clutch so that the fluctuations (if any) of torque which are being transmitted by the damper are within an acceptable range. The torque capacity of the damper, i.e., the maximum torque transmittable by the energy absorbing elements (such as the coil springs 237 and 250) of the damper, is less than the nominal (i.e., maximum) torque transmittable by the prime mover and its output element (such as the rotary output element 13 shown in FIG. 1). Otherwise stated, and in contrast to prior proposals, the damper which is utilized in the apparatus of the present invention and enables such apparatus to be used for the practice of the methods of the present invention, need not be designed to transmit torque when the prime mover is operated at a maximum load. When the torque capacity of the damper is reached or exceeded, the lockup clutch or at least the damper which cooperates with or forms part of such lockup clutch acts not unlike a rigid body, i.e., the damper transmits the entire torque which is being transmitted to its input member. Due to the fact that the damper is not called upon to transmit the entire torque but is effective only within one or more portions of the entire range of torques being transmitted to the input element of the variable-speed transmission or another driven unit, the economy, the compactness, the reduction of weight, the lengthening of useful life, the simplicity and certain other desirable parameters of the damper can be enhanced to a surprising extent. For example, it is possible to employ a damper which is equipped with relatively weak coil springs and/or other suitable energy storing elements. This, in turn, renders it possible to reduce the space requirements, the weight and the cost of such energy storing elements as well as the cost, weight and space requirements of the entire torque transmitting apparatus. As already mentioned above, it is possible to limit the magnitude of torque which can be transmitted by the damper 20b, 135 or 235 by permitting the convolutions of its coil springs to come into full abutment with each other. However, and as also mentioned above and as shown, for example, in FIGS. 8 and 9, the damper and/or one or more other constituents of the improved apparatus can be provided with means (such as the teeth 255, 256 shown in FIGS. 8 and 9) which prevent any further stressing of the resilient energy storing elements when the magnitude of the transmitted torque reaches or exceeds a preselected torque capacity of the damper. A presently preferred damper is designed in such a way that its torque capacity is between 10% and 60% (e.g., between 25% and 50%) of the nominal torque of the prime mover (e.g., a combustion engine in a motor vehicle). However, it is also possible to employ a damper whose torque capacity is below 10% or above 60% of the nominal torque of the prime mover.

Another important advantage of the improved damper is that it does not or need not employ any discrete friction generating means. Thus, each of the aforedescribed dampers 20b, 135, 235 can be constructed and assembled in such a way that it merely employs an input member, an output member and one or more energy storing elements disposed between the input and output members and serving to oppose angular movements of such members relative to one another. Thus, the damper need not employ friction discs or other parts which must rub against each other while the input and output members of the damper turn relative to each other. This contributes to a longer useful life of the damper and to a reduction of its space requirements. Moreover, the torque capacity of such a damper remains or can remain constant during the entire useful life of the torque transmitting apparatus.

The aforementioned range of torque capacities of the damper (between about 10% and 60%, preferably between about 25% and 50% of the nominal torque of the prime mover) have been found to be highly satisfactory when the apparatus embodying a hydrokinetic torque converter with a lockup clutch and the aforedescribed damper is utilized in the power train between the engine and the variable-speed transmission of a motor vehicle. The reason is that the damper is capable of absorbing or compensating for all or nearly all fluctuations of torque which develop or are expected to develop when the actual torque being transmitted by the engine is not appreciably less than 10% and not appreciably more than 60% of the nominal torque.

It was further ascertained that the extent of angular displacement of the input and output members of a damper which can be utilized with advantage in the improved torque transmitting apparatus can be much less than that of input and output members which form part of dampers in heretofore known torque transmitting apparatus utilizing a hydrokinetic torque converter with a lockup clutch and a damper in the cover of the torque converter. As explained hereinbefore, the extent of angular movement between the input and output members (e.g., the input and output members 138, 139 of the damper 135 shown in FIGS. 3 to 5) can be within the relatively narrow range of between ±2° and ±8°, preferably between ±3° and ±6°. Thus, the total angular displacement of the input and output members relative to each other (in the clockwise and counterclockwise directions) can be between about 4° and 16° preferably between 6° and 12°. Such relatively small angular displacement is particularly desirable and advantageous when the operation of a motor vehicle embodying the improved torque transmitting apparatus is shifted from coasting to pulling a load or vice versa. Relatively small angular displacements of the input and output members of the damper relative to each other under such circumstances (shifting from pull to coasting or vice versa) reduce the likelihood of, or prevent the development of, an excessive buildup of resonant vibrations in the power train of the motor vehicle. Any fluctuations of torque beyond the torque capacity of the damper are compensated for in that the friction surfaces of the lockup clutch are caused to slide relative to each other. Thus, the novel combination of the lockup clutch and damper is effective within a wide range of operations of a motor vehicle with the improved apparatus between the engine and the variable-speed transmission, i.e., the input element of the transmission is not likely to be subjected to any, or any pronounced or excessive, fluctuations of torque being transmitted by the hub of the turbine forming part of the hydrokinetic torque converter.

In most instances, the rigidity of the damper can be selected in such a way that it is between about 7 Nm/° and 30 Nm/°, preferably between about 8 Nm/° and 15 Nm/°. However, it is also possible (under certain operating conditions) to utilize a damper with a rigidity of less than 7 Nm/°, or more than 70 Nm/°. It has also been ascertained that, at least under most circumstances, the torque capacity of the damper can be between about 30 Nm and 90 Nm, preferably between about 40 Nm and 70 Nm. If the nominal torque of the prime mover (such as a combustion engine in a motor vehicle) is relatively small, the torque capacity of the damper can be less, even considerably less, than about 30 Nm. On the other hand, the torque capacity of the damper can be above, even well above, 90 Nm if the cover of the hydrokinetic torque converter receives torque from a powerful engine.

One presently preferred method of transmitting torque by way of a hydrokinetic torque converter which is constructed and assembled in accordance with the present invention and transmits torque to the rotary input element (such as 14a) of a variable-speed transmission having at least one forward shift stage comprises the step of regulating (such as by the processor 32a, regulating unit 32 and valve 31 of FIG. 1) the transmission of torque by the lockup clutch (such as the clutch 12) as a function of variations of energy- and/or power-related parameters at least in the one forward shift stage of the variable-speed transmission. If the variable-speed transmission includes two or more forward shift stages, the transmission of torque by the lockup clutch can be regulated depending upon variations of energy- and/or power related parameters within two forward shift stages or within each forward shift stage of the variable-speed transmission. However, it is equally possible to design the regulating means for the operation of the lockup clutch in such a way that the lockup clutch remains disengaged within the first and/or second forward shift stage(s) of the variable-speed transmission.

The method and apparatus of the present invention can be utilized with advantage in connection with or in power trains of the type disclosed in commonly owned German patent application No. P 43 28 182.6 and/or in corresponding applications pending or patented in other countries including the United States of America. The disclosure of such German patent application and/or of the corresponding applications in countries other than Federal Republic Germany is incorporated herein by reference. The aforementioned German patent application discloses various embodiments of a lockup clutch which can be utilized in a hydrokinetic torque converter and at least some embodiments of such lockup clutch can be put to use in the apparatus of the present invention.

In accordance with another method of transmitting torque by a slipping lockup clutch in a hydrokinetic torque converter which receives torque from an engine, the transmission of torque (e.g., by the components 31, 32, 32a of the apparatus shown in FIG. 1) via a lockup clutch can be regulated in a plurality of stages including the transmission of torque by the lockup clutch in at least two stages (reference may be had again to FIG. 6) one of which involves the transmission of torque within a range of between about 10% and 60% (preferably between about 15% and 50%) of the maximum engine torque and another of which involves the transmission of torque corresponding to at least 60% of the maximum torque transmitted by the engine. The selection of the magnitude of torque which the lockup clutch can transmit during the aforementioned stages (with reference to the magnitude of torque being transmitted by the output element of the engine) can be made depending on parameters other than those proposed before. For example, the aforementioned commonly owned German patent application No. P 43 28 182.6 proposes to attribute different importance to one or more parameters during different stages of torque transmission by the lockup clutch. Such parameters include a torque dividing factor ($K_{mc}$), a correction factor ($K_{korr}$) to compensate for multiplicative errors, a correction torque ($M_{korrMot}$) to compensate for errors in addition to engine torque), and correction torque ($M_{korrWü}$) to compensate for errors in addition to clutch torque. In other words, the magnitude of at least one of the above-enumerated factors (and hence the influence of the at least one factor upon the torque being transmitted by the lockup clutch) is different during the aforementioned stages. In contrast to such earlier proposal, the first stage of regulation in accordance with the aforediscussed novel method involves the transmission of torque within a range of between about 10% and 60% of a maximum torque transmitted by the engine during one stage and the transmission of torque corresponding to at least 60% of the engine torque during another stage. The other stage can immediately follow the one stage.

The magnitude of the torque which the lockup clutch can transmit during the one stage can exceed the magnitude of torque actually transmitted by the engine. It is also possible to regulate the magnitude of the torque transmitted by the lockup clutch in such a way that the maximum torque transmittable by the lockup clutch during the one stage matches or at least approximates the torque capacity of the damper. This ensures that relatively small fluctuations of torque transmitted by the output element of the engine are compensated for by the damper and the lockup clutch begins to slip when the peaks of oscillations of torque being transmitted by the output element of the engine exceed the torque capacity of the damper. Such slipping of the clutch ensures that at least the majority if not all of the oscillations of torque being transmitted by the output element of the engine cannot affect the torque which is being transmitted to the input element of the variable-speed transmission.

An advantage of the step of selecting the magnitude of the torque transmittable by the lockup clutch during the one stage to exceed the magnitude of torque actually being transmitted by the engine (i.e., the magnitude of the torque which the engine can transmit depending on the quantity of fuel being supplied to the engine) is that the operation of the lockup clutch can be regulated with a view to ensure that the torque being transmitted by the lockup clutch within a first range of rotational speeds of the output element of the engine varies in exact or substantial synchronism with variations of the torque transmitted by the output element of the engine. Thus, the magnitude of the torque which the lockup clutch can transmit decreases in response to decreasing torque which is being transmitted by the output element of the engine, but the magnitude of the torque which the lockup clutch can transmit exceeds the torque actually being transmitted by the output element of the engine. Analogously, the magnitude of torque which the lockup clutch can transmit increases in response to increasing magnitude of the torque actually being transmitted by the output element of the engine. It has been found that the torque which the lockup clutch transmits during the one stage (within a first range of rotational speeds of the engine) can be between 1 and at least 1.2 times the torque being simultaneously transmitted by the engine.

It is also possible to regulate the magnitude of torque being transmitted by the lockup clutch in such a way that it remains at least substantially constant within the aforementioned one range or first range and that it is within between about 25% and 60% (preferably between about 30% and 50%) of the maximum torque of the engine. The constant torque which the lockup clutch can transmit within the one range can at least match but preferably exceeds the torque capacity of the damper; for example, the constant torque transmitted by the lockup clutch can be between 1.05 and 1.2 times the torque capacity of the damper.

In accordance with still another modification, the magnitude of the torque which the lockup clutch can transmit during a first part of the one stage (preferably while the RPM of the output element of the engine is immediately above the idling RPM of the engine) remains at least substantially constant, whereas the magnitude of torque which the lockup clutch can transmit during a second part of the one stage varies in at least substantial synchronism with variations of torque being then transmitted by the output element of the engine. Thus, if the magnitude of the torque transmitted by the engine during the second part of the one stage increases, the capacity of the lockup clutch to transmit a larger torque also increases. The arrangement is preferably such that the magnitude of torque which the lockup clutch can transmit during the aforementioned second part of the one stage at least matches but preferably somewhat exceeds the momentary torque being transmitted by the output element of the engine.

In order to ensure a highly accurate regulation or control of torque which can be transmitted by the lockup clutch, it can be of particular advantage to ensure that the minimum torque transmittable by the lockup clutch, at least within a portion of the one range of torques transmittable by the engine, is not less than approximately 1% of the nominal torque of the engine and is preferably at least slightly above 1%. This ensures that the fluid pressure for the lockup clutch does not drop below a lower threshold value, namely that the fluid pressure is not less than that which can be satisfactorily selected and regulated by available valves, e.g., valves of the character shown in FIG. 1. Thus, by resorting to the novel expedient of ensuring that the minimum torque which the lockup clutch can transmit is not less than at least 1% of the nominal torque of the engine, one can regulate the fluid pressure with a high degree of accuracy.

As already mentioned hereinbefore, the first range of rotational speeds of the output element of the engine can extend between the idling RPM and not more than 3000 RPM, preferably between idling RPM and 2000–2500 RPM. Here, again, it might be desirable (under certain specific circumstances) to select the first range of rotational speeds in such a way that its upper limit is above 3000 RPM or below 2000 RPM.

It is also possible to select the torque which can be transmitted by the lockup clutch in such a way that the damper is effective (either primarily or exclusively) within a first or lower part of the entire operating range of the torque transmitting apparatus and that the lockup clutch takes care of oscillations of torque being transmitted by the output element of the engine within a second or higher part which immediately follows the first part. In other words, the lockup clutch will be operated with slip if the oscillations of transmitted torque within the second part of the entire operating range of the torque transmitting apparatus are sufficiently pronounced to warrant a compensation by causing or permitting the lockup clutch to operate with slip. Furthermore, it is also possible to design the damper in such a way that it can be caused to damp oscillations during the aforementioned second part of the operating range of the torque transmitting apparatus. All that is necessary is to ensure that the energy storing elements of the damper can dissipate stored energy prior to transition or during transition from the first part to the second part of the operating range of the apparatus so that the energy storing elements can store energy again within that part of the operating range when the transmission of excessive fluctuations of torque from the output element of the engine to the input shaft of a variable-speed transmission or another driven unit is prevented by causing the lockup clutch to operate with slip. If the damper is designed in the just-outlined manner, it is presently preferred to ensure that the lockup clutch takes care of the major part of the task of preventing the transmission of fluctuations of torque to the driven unit within the second part of the operating range of the torque transmitting apparatus.

As a rule, the damper will be designed to operate or to be effective primarily within the first part of the operating range of the apparatus, and its torque capacity is normally between 10% and 60% (preferably between 15% and 50%) of the nominal torque of the engine. In accordance with a further feature of the invention, the damper can be constructed, assembled and operated in such a way that its input and output members can turn relative to each other through a first angle within the aforementioned first part of the operating range of the apparatus and thereupon through a relatively small second angle at which time the gradient of its energy storing elements (such as coil springs) is much steeper, i.e., the characteristic curve of the energy storing elements during angular movement of the input and output members relative to each other within the second angle is much steeper than the characteristic curve during angular movement through the larger first angle. Such a design of the torsional damper ensures that the parts (such as the teeth 255, 256 shown in FIGS. 8 and 9) are much less likely to impact against each other with a considerable force, such as could result in the generation of undesirable noise and/or in damage to and shorter useful life of the damper. The first angle can be between 2 and 5 times larger than the second angle; a presently preferred ratio is approximately 2.5 to 1. The rigidity of the damper while its input and output members turn relative to each other through the preferably smaller second angle can be between four and ten times the rigidity of the damper (i.e., of the energy storing elements of the damper) when the input and output members turn relative to each other through the preferably larger first angle. In many instances, it suffices if the rigidity during angular displacement through the second angle is between about two and five times the maximum rigidity at the end of first angular movement of the input and output members relative to each other. In any event, it is presently preferred to select the torque capacity of the damper in such a way that it is less than the nominal torque of the engine. The magnitude of the second angle can be between about 0.5° and 3°, preferably between 1° and 2°. It is also possible to design the energy storing elements of the damper in such a way that the damper is effective only while the vehicle embodying an engine and the improved torque transmitting apparatus is in the process of pulling a load.

The aforediscussed drawback of conventional torque transmitting apparatus that the lockup clutch generates readily detectable humming or similar noise (because its friction surfaces alternately adhere to and slide relative to each other, particularly when the apparatus is in the process of transmitting relatively small torques) is believed to have been overcome in that the damper 20b, 135 or 235 is effective to absorb fluctuations of torque being transmitted by the output element of the engine if and when the friction surfaces of the lockup clutch tend to adhere to each other at a time when the fluctuations of torque would normally be absorbed or counteracted by the lockup clutch.

The improved apparatus can be designed in such a way that the lower limit of the range of operation of the lockup clutch with slip is lowered when a motor vehicle embodying the improved apparatus is operated under circumstances such that the torque being transmitted by the output element of the engine at a relatively low RPM (e.g., immediately above the idling RPM) fluctuates within a wide range, e.g., at resonance RPM and/or in response to changes of the load upon the vehicle. If necessary, the magnitude of the torque transmittable by the lockup clutch when the engine is coasting can be reduced all the way or at least close to zero in response to changes of load upon the vehicle. It is also possible to reduce (if necessary) the magnitude of the torque being transmittable by the lockup clutch within the aforediscussed second or higher range of rotational speeds of the engine.

As already mentioned above, the apparatus of the present invention can be designed in such a way that at least a major part of a first range of torques is transmitted from the output element of the engine to the input element of a driven unit within the main driving or operational range of the engine, or that at least a major part of the characteristic curve of the engine is within the first range of torques. It is preferred and advisable that the main driving range of the engine embrace or encompass at least those regions of the characteristic curve which are relevant for the FTP75 cycle and/or for the ECE cycle covering transport on city, state and interstate roads (90 km/h in the city and 120 km/h outside of city limits). Such design ensures that the transmission of oscillations of torque is prevented (either entirely or primarily) by the damper within the entire main driving range, i.e., that the torque converter is bypassed practically uninterruptedly which, in turn, results in more economical operation of the vehicle because the energy requirements of the engine are lower. Such a mode of operation is not contemplated by the makers of heretofore known torque transmitting apparatus which employ a slipping lockup clutch because the lockup clutch of such conventional apparatus is supposed to slip within the RPM range immediately above the idling RPM. This can be readily ascertained by referring to the prior publications which are mentioned in the present specification under the heading "BACKGROUND OF THE INVENTION". It has been found that the transmission of oscillations of torque to the input element of a driven unit can be prevented much more effectively if the damper is operative within the main driving range of the vehicle, i.e., if the damper is constructed, assembled and operated in such a way that it is operative, either primarily or exclusively, within the main driving range of the motor vehicle. Such a damper is much more effective than a damper which is designed to counteract oscillations of torque within as well as above the main driving range of the vehicle. Moreover, a damper which is designed to be operative, mainly or exclusively, within the main driving range of the vehicle is simpler and more compact than the dampers which are proposed for use in conventional torque transmitting apparatus.

The torque which the lockup clutch can transmit within the second or higher range of rotational speeds of the output element of the engine can be between 0.6 and 1 times (preferably between 0.8 and 0.9 times) the then prevailing torque of the engine. Thus, the torque which the lockup clutch can transmit during the aforementioned second range should be less than the momentary torque being transmitted by the output element of the engine. Such a mode of operation of the lockup clutch ensures that the later operates with some slight slippage within the second range of rotational speeds of the output element, i.e., that the clutch is then effective to absorb or to compensate for fluctuations (if any) of the torque being transmitted by the output element of the engine.

If the improved apparatus is installed in a so-called uncritical motor vehicle (namely a vehicle whose engine is not likely to transmit fluctuating torque within the second range of rotational speeds of the output element), the lockup clutch can remain engaged or practically engaged, i.e., the torque being transmitted by the clutch can correspond to the torque being then transmitted by the output element of the engine. As a rule, the magnitude of the torque which the lockup clutch can transmit will be slightly larger than the magnitude of the torque actually being transmitted by the output element, e.g., between 1 and 1.2 times the torque being transmitted by the output element.

The preceding paragraphs of this specification refer to two RPM ranges including a first range immediately above the idling RPM and a second range immediately above the first range. However, it is equally within the scope of the invention to divide the entire spectrum of rotational speeds of the engine above the idling RPM into more than two (first and second) ranges. For example, the second range can consist of two narrower ranges including a lower range and a higher range. The torque converter is then fully bypassed during the higher range and the lower limit of such higher range is or can be selected in such a way that the torque then being transmitted by the engine is not likely to require compensation for undesired oscillations such as would necessitate slippage of the lockup clutch.

In accordance with a further feature of the invention, the improved apparatus for transmission of torque from the rotary output element of an engine to the rotary input element of a variable-speed transmission having a plurality of speed ratios can comprise a hydrokinetic torque converter with an engageable and disengageable lockup clutch and means for monitoring the speed of the motor vehicle in which the engine and the torque converter are installed. The monitoring means can be designed to ascertain whether or not a disengagement of the lockup clutch at a particular speed would contribute to an increase of the towing force of the vehicle by way of the torque converter without a change of the speed ratio of the variable-speed transmission, and such monitoring means can disengage the lockup clutch when the disengagement of the clutch contributes to the increase of the towing force. Still further, the monitoring means can be designed to shift the variable-speed transmission into a lower speed ratio when the disengagement of the lockup clutch does not contribute to the aforementioned increase of the towing force. Such monitoring means can be designed to carry out the above-outlined operations at least while the vehicle is being accelerated. The lockup clutch can be disengaged, at least in part, when the monitoring means is caused to shift the variable-speed transmission into a lower speed ratio, i.e., the lockup clutch is then operated with a certain amount of slip. The monitoring means can include an electronic computer or processor and one or more sensors which actually monitor one or more variable parameters. At least some of these parameters can be stored in the memory of the computer or processor in the form of charts, maps or characteristic curves. For example, the memory of the computer or processor can store the characteristic curves of the torque converter and/or the engine and/or the lockup clutch. As shown in FIG. 1, the operating condition of the engine can be monitored by ascertaining its rotational speed, the inclination of the pivotable valving element of the throttle valve (i.e., the quantity of fuel being supplied to the engine), the pressure in the suction pipe and/or, if necessary, the timing of fuel injection. All of the details of such an electronic computer or processor are disclosed in the aforementioned copending German patent application No. P 43 28 182.6 and in the corresponding patent applications filed in countries other than Federal Republic Germany. As mentioned hereinbefore, the disclosures of such pending applications (or patents granted on such applications) are incorporated herein by reference.

The torque converter of the improved apparatus can be fully bypassed when the RPM of the engine rises to a certain value, i.e., when the speed of the motor vehicle rises to a predetermined value. The apparatus then acts as a substantially rigid torque transmitting assembly and this does not affect the comfort and/or other desirable characteristics of the vehicle because, as a rule, the fluctuations of torque are not very pronounced when the engine speed (i.e., the speed of the motor vehicle) reaches the aforementioned value. The lockup clutch of such apparatus is designed to operate with slip when the speed of the engine reaches the aforementioned value, preferably in such a way that the clutch begins to slip when the torque being transmitted thereto at least approximates or exceeds the engine torque.

As already mentioned before, the torsional damper which is constructed, assembled, installed and operated in accordance with the present invention and the lockup clutch which cooperates with such damper ensure that, when the engine is operated under partial load and fluctuations of transmitted torque caused by alternating slippage and full engagement of the friction surfaces of the clutch relative to each other could entail the generation of undesirable noise, the damper compensates for intermittent full engagement of the lockup clutch at a time when the friction surfaces of the clutch should slide relative to each other so that the generation of noise is reduced to or at least approximates zero. Furthermore, the apparatus is unlikely to transmit abrupt or jerky vibrations when the engine is operated under partial load. As a rule, the "softness" of the damper will be selected depending upon the parameters of the engine in which the apparatus is to be put to use. If the torsional damper encompasses a resonance range which is covered when the vehicle is in operation, the lockup clutch is preferably designed to operate with slip within such resonance range. This also contributes to a reduction or full elimination of humming and/or other noises when the torque transmitting apparatus is in use.

The changes of load within the first range of rotational speeds of the output element of the engine above the idling RPM are limited due to the relatively small angle of displacement of the input and output members of the damper relative to each other and also because the lockup clutch begins to slide in response to the application of a torque which is relatively low when compared with the maximal torque of the engine. Thus, the ability of the lockup clutch to transmit torque within the RPM range immediately above the idling RPM can be selected in such a way that it is only slightly above the torque being then transmitted by the engine. Hence, the lockup clutch can counteract the tendency of the power train embodying the novel apparatus to oscillate in response to changes of load. When the RPM of the output element of the engine rises to a higher value (i.e., when it is within the aforediscussed second range) because the load upon the engine is higher, the maximum torque which the lockup clutch can transmit is less than the then prevailing engine torque, i.e., the lockup clutch then operates with slip. Such slippage also reduces the likelihood of the development of noise, at least within a certain range of torques, because the friction surfaces of the lockup clutch slide relative to each other without recurring intervals of non-slippage.

The construction of the improved apparatus is preferably such that the torque converter is bypassed within the entire operating range of the engine (such as a combustion engine) only when this is advisable in order to save energy. The reason is that it is advisable, during certain stages of operation of the engine, to avoid any (even partial) bypassing of the torque converter. Furthermore, the lockup clutch is engaged when the driver of a vehicle embodying the improved torque transmitting apparatus is in the process of accelerating the engine in order to effect a change of the transmitted torque.

The improved apparatus preferably employs a so-called "soft" torque converter. The characteristic features of a "soft" torque converter are described in the aforementioned commonly owned German patent application No. P 43 28 182.6. The utilization of a "soft" torque converter renders it possible to achieve a more satisfactory acceleration of a motor vehicle because the torque converter has a wider torque conversion range. Moreover, the efficiency is more satisfactory within a larger part of the operating range of a "soft" torque converter than the efficiency of a conventional apparatus employing a "hard" torque converter. The "soft" torque converter renders it possible to reduce losses of output and to thus reduce the consumption as well as the temperature of the fluid (normally oil) which is being admitted into the cover or housing of the torque converter (e.g., by way of the conduit 30 shown in FIG. 1). The lower-efficiency range of a "soft" torque converter is bypassed by the simple expedient of engaging the lockup clutch to an extent which allows certain slippage of the friction surfaces relative to each other while the clutch receives torque from the output element of the engine. It has been found that the above-outlined "soft" torque converter and a lockup clutch which slips within the lower efficiency range of the torque converter ensure that the efficiency is more satisfactory and the losses of output are lower during each stage of operation of a vehicle embodying such torque transmitting apparatus. Since the lockup clutch can be caused to be effective in each speed ratio of the variable-speed transmission, the energy requirements of a motor vehicle with a power train which embodies the improved apparatus are not higher than those of a motor vehicle with a power train which does not employ a hydrokinetic torque converter.

Figure 10:
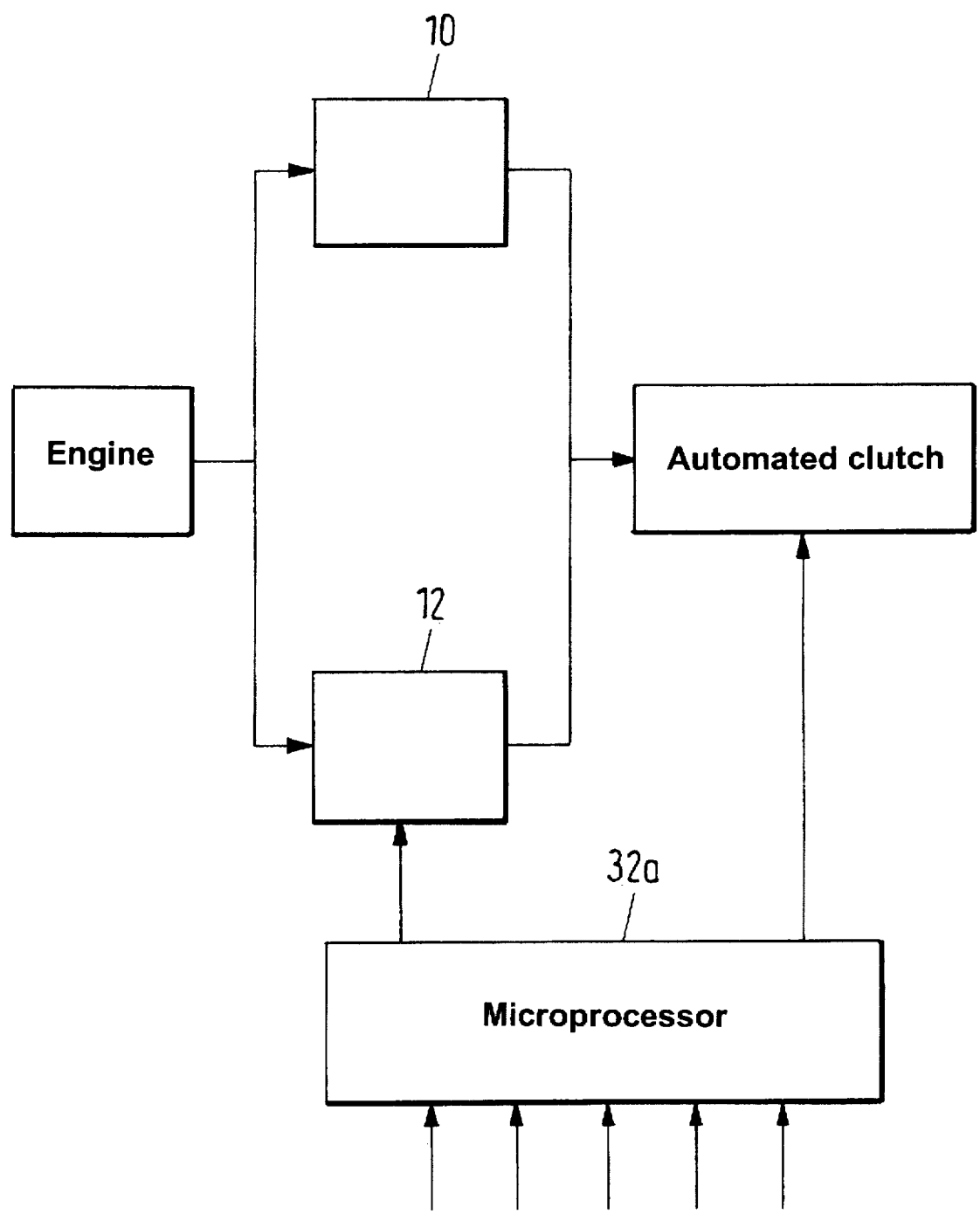
FIG. 10 is a block diagram of a hydrokinetic torque converter, a lockup clutch and a computer for controlling them and the gear setting of an automatic transmission driven by the converter and clutch.

The block diagram of FIG. 10, like FIG. 1, shows a computer apparatus 32a which determines, at least during acceleration of a motor driven vehicle, if opening of the lockup clutch 12 will increase the torque delivered by the torque converter while the transmission is in the same gear. In order to accomplish this, the system input variables are measured and monitored. Also, information on the torque converter, e.g. in the form of a performance graph of the torque converter 10 under both opened and closed conditions, is forwarded to computer 32a which calculates whether the opening of the lockup clutch guarantees an increase of torque in the same gear. If this is not the case at the respective point of operation, then at least the transmission is set back by one gear.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of the above-outlined contribution to the art and, therefore, such adaptations should and are intended to be comprehended within the meaning and range of equivalence of the appended claims.

What is claimed is:

1. Apparatus for transmitting torque from a rotary output element of a prime mover including an engine, comprising a hydrokinetic torque converter including a lockup clutch having a torsion damper with a torque capacity less than a nominal torque of the engine, and means for regulating the transmission of torque by said lockup clutch in two stages one of which involves the transmission by said lockup clutch and said damper of torque within a range of between about 10% and 60% of a maximum torque transmitted by said engine and the other of which involves the transmission of torque corresponding to at least 60% of the maximum torque transmitted by said engine, the magnitude of torque which said lockup clutch and said damper can transmit during said one stage exceeding the magnitude of torque being actually transmitted by said engine.

2. Apparatus for transmitting torque from a rotary output element of a prime mover including an engine, comprising a hydrokinetic torque converter including a lockup clutch having a torsion damper, said torsion damper being part of said lockup clutch and having a torque capacity less than a nominal torque of the engine and said torsion damper having means for taking up fluctuations of torque within a first range of torques being transmitted by said output element, said lockup clutch being operative to slip in response to fluctuations of torque within a second range of torques being transmitted by said output element, and further comprising means for reducing the magnitude of torque adapted to be transmitted by said damper within said first range of torques in response to pronounced oscillations of torque being transmitted by a power train including said torque converter, said means for reducing the magnitude of torque being responsive to either resonance RPM or changes of load upon said engine.

3. Apparatus for transmitting torque from a rotary output element of a prime mover including an engine, comprising a hydrokinetic torque converter including a lockup clutch having a torsion damper with a torque capacity less than a nominal torque of said engine, said torque converter further including a turbine and said lockup clutch further having an input member receiving torque from said output element, said torsion damper being disposed between an output member of said clutch and said turbine and said torque capacity at least approximating an upper limit of a first range of a plurality of ranges of torque being transmitted by said engine, the minimum torque transmittable by said clutch within said first range of torques being transmittable by said engine at least equaling 1% of said nominal torque.

4. Apparatus for transmitting torque from a rotary output element of a prime mover including an engine, comprising a hydrokinetic torque converter including a lockup clutch having a torsion damper with a torque capacity less than a nominal torque of said engine, said torque converter further including a turbine and said lockup clutch further having an input member receiving torque from said output element, said torsion damper being disposed between an output member of said clutch and said turbine and said torque capacity at least approximating an upper limit of a first range of a plurality of ranges of torque being transmited by said engine, said first range of torques being transmitted while said engine is driven within an engine RPM range between an idling RPM and about 3000 RPM.

5. Apparatus for transmitting torque from a rotary output element of a prime mover including an engine, comprising a hydrokinetic torque converter including a lockup clutch having a torsion damper with a torque capacity less than a nominal torque of said engine, said torque converter further including a turbine and said lockup clutch further having an input member receiving torque from said output element, said torsion damper being disposed between an output member of said clutch and said turbine and said torque capacity at least approximating an upper limit of a first range of a plurality of ranges of torque being transmitted by said engine, said plurality of ranges further embracing a second range of torques being transmittable by said engine and the torque transmitting capacity of said clutch within said second range being between about 0.6 and 0.99 times the actual torque being transmitted by said output element.

6. Apparatus for transmitting torque from a rotary output element of a prime mover including an engine in a motor vehicle, comprising a hydrokinetic torque converter including a lockup clutch having a torsion damper with a torque capacity less than a nominal torque of said engine, said torque converter being arranged to transmit torque to a rotary input element of a variable-speed transmission having a plurality of speed ratios, said lockup clutch being an engageable and disengageable clutch and said torque converter further including means for monitoring the speed of the vehicle and for ascertaining whether or not a disengagement of said clutch at a particular speed contributes to an increase of the towing force of the vehicle by way of said torque converter without a change of the speed ratio of said variable-speed transmission, for disengaging said clutch when the disengagement of said clutch contributes to said increase of the towing force, and for shifting said variable-speed transmission into a lower speed ratio when the disengagement of said clutch does not contribute to said increase of the towing force.

7. The apparatus of claim 3, wherein said major part of said first range is within a portion of said main driving range which encompasses at least one of an FTP75 cycle and an ECE cycle.

8. The apparatus of claim 4, wherein said first range of torques is being transmitted within an engine RPM range between an idling RPM and 2000–2500 RPM.

9. The apparatus of claim 5, wherein the torque transmitting capacity of said clutch within said second range is between 0.8 and 0.9 times the actual torque being transmitted by said output element.

10. The apparatus of claim 1, wherein the magnitude of torque which said lockup clutch transmits during said one stage is between 1 and 1.2 times the magnitude of torque being simultaneously transmitted by said engine.

* * * * *